United States Patent
Yamakawa

(10) Patent No.: US 10,402,128 B2
(45) Date of Patent: Sep. 3, 2019

(54) PRINT CONTROL APPARATUS, CONTROL METHOD FOR CONTROLLING PRINT CONTROL APPARATUS, AND RECORDING MEDIUM

(71) Applicant: CANON KABUSHIKI KAISHA, Tokyo (JP)

(72) Inventor: Junichi Yamakawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/961,170

(22) Filed: Apr. 24, 2018

(65) Prior Publication Data

US 2018/0314471 A1 Nov. 1, 2018

(30) Foreign Application Priority Data

Apr. 28, 2017 (JP) .................. 2017-089643

(51) Int. Cl.
*G06F 3/12* (2006.01)
*H04N 1/00* (2006.01)

(52) U.S. Cl.
CPC .......... *G06F 3/1208* (2013.01); *G06F 3/1204* (2013.01); *G06F 3/1254* (2013.01); *G06F 3/1256* (2013.01); *G06F 3/1258* (2013.01); *G06F 3/1285* (2013.01); *H04N 1/00623* (2013.01); *H04N 1/00665* (2013.01); *G06F 3/121* (2013.01)

(58) Field of Classification Search
CPC .... G06F 3/1208; G06F 3/1204; G06F 3/1254; G06F 3/1256; G06F 3/1258; G06F 3/121; H04N 1/00623; H04N 1/00665

USPC ......................................................... 358/1.15
See application file for complete search history.

(56) References Cited

U.S. PATENT DOCUMENTS

| | | | | |
|---|---|---|---|---|
| 6,944,411 B2* | 9/2005 | Iseki | .................. | G03G 15/5066 |
| | | | | 399/391 |
| 7,048,272 B2* | 5/2006 | Lay | .................. | B65H 29/60 |
| | | | | 271/225 |
| 9,415,613 B2* | 8/2016 | Inui | .................. | G06K 15/1809 |
| 9,549,092 B2* | 1/2017 | Kitahara | ............ | H04N 1/00925 |
| 2007/0251402 A1* | 11/2007 | Monden | .................. | B41L 13/06 |
| | | | | 101/116 |
| 2012/0075646 A1* | 3/2012 | Koike | ................ | G06K 15/1809 |
| | | | | 358/1.9 |

(Continued)

FOREIGN PATENT DOCUMENTS

JP  200688513 A  4/2006

*Primary Examiner* — Allen H Nguyen
(74) *Attorney, Agent, or Firm* — Canon U.S.A., Inc. IP Division

(57) ABSTRACT

A print control apparatus includes a storage unit, a reception unit, a change unit to change sheet information, and an instruction unit and communicates with a printing apparatus. The printing apparatus has a plurality of sheet holding units to hold sheets that can be conveyed and used for printing. The storage unit stores sheet information of the sheets held in a different one of the plurality of sheet holding units. The reception unit receives sheet information of a sheet held in a sheet holding unit of the plurality of sheet holding units. If the stored sheet information of the sheet held in the selected sheet holding unit is changed to the received sheet information, the instruction unit instructs the printing apparatus not to use the sheet held in the selected sheet holding unit for printing.

16 Claims, 15 Drawing Sheets

(56) References Cited

U.S. PATENT DOCUMENTS

2013/0187325 A1\* 7/2013 Ohmiya ............... B65H 5/00
271/3.14

\* cited by examiner

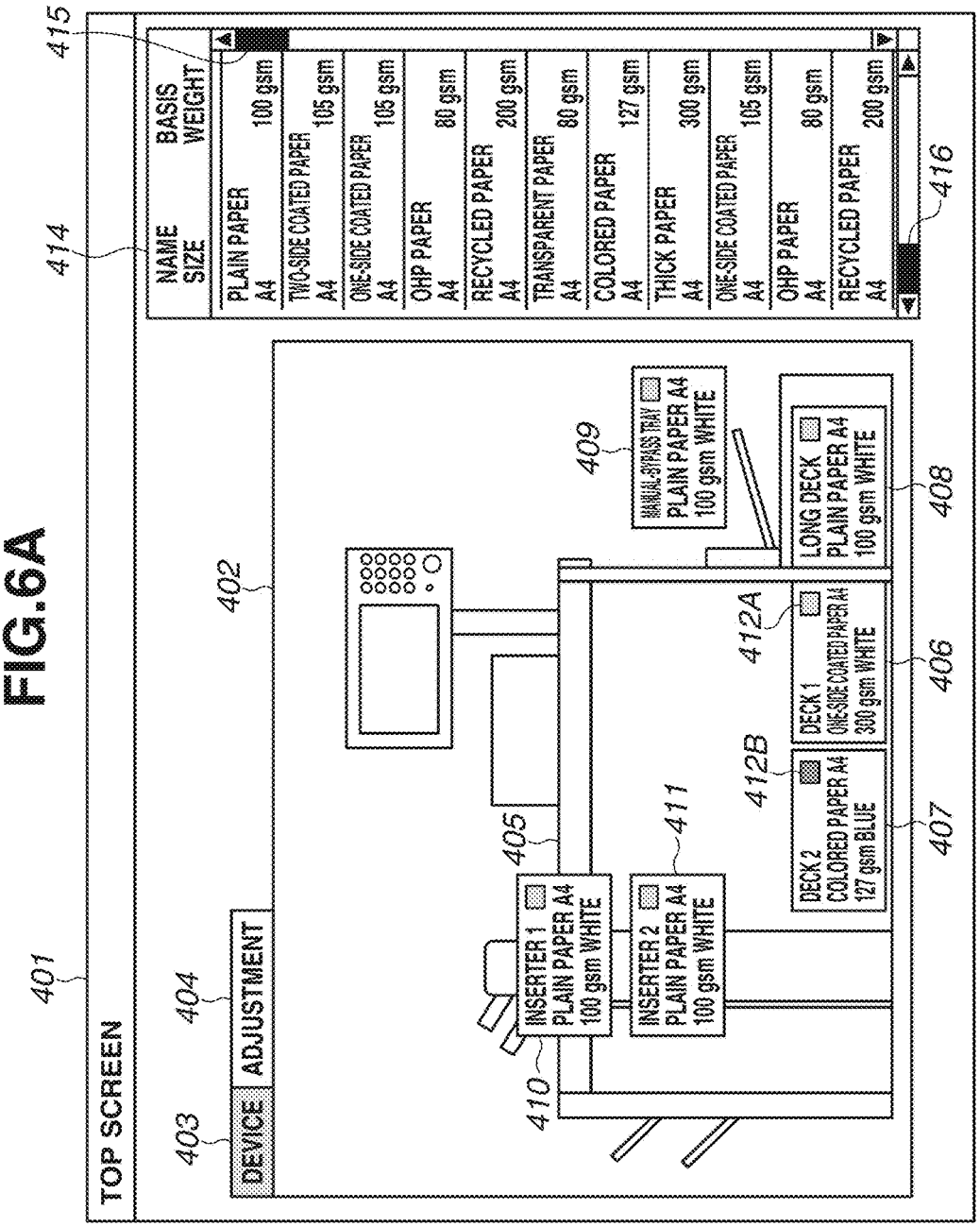

FIG.9

DECK 1

[ASSIGNMENT] [SHEET LIST UPDATE] [CLOSE]

SHEET INFORMATION

- NAME: THICK PAPER
- BASIS WEIGHT: 300 g/m²
- SIZE: A4
- SURFACE PROPERTY: HIGH-QUALITY PAPER
- FEATURE: PLAIN

- IMAGE POSITION ADJUSTMENT: NOT ADJUSTED
- CURL CORRECTION: NOT ADJUSTED
- ADJUSTMENT OF SADDLE FOLDING POSITION: 0 mm
- ADJUSTMENT OF CREEP CORRECTION AMOUNT: 0 mm
- ADJUSTMENT OF SADDLE STITCH FOLDING POSITION: 0 mm
- COLOR: WHITE
- SECOND SIDE OF TWO SIDES: NOT PRINTED
- FIBER DIRECTION: INDETERMINATE
- CHANGE IN SADDLE STITCH POSITION: 0 mm
- ADJUSTMENT OF SECONDARY TRANSFER VOLTAGE: NOT ADJUSTED
- ADJUSTMENT OF FRONT END PORTION SECONDARY TRANSFER VOLTAGE: NOT ADJUSTED
- ADJUSTMENT OF SECONDARY TRANSFER STATIC ELIMINATION BIAS: NOT ADJUSTED
- ADJUSTMENT OF PRIMARY TRANSFER VOLTAGE: NOT ADJUSTED

SHEET LIST

| SHEET NAME | BASIS WEIGHT | SIZE | WIDTH | HEIGHT | SURFACE PROPERTY | FEATURE | COLOR |
|---|---|---|---|---|---|---|---|
| THICK PAPER | 300 | A4 | 2970 | 2100 | HIGH-QUALITY PAPER | PLAIN | WHITE |
| TWO-SIDE COATED PAPER | 105 | A4 | 2970 | 2100 | TWO-SIDE COATED PAPER | PLAIN | WHITE |
| ONE-SIDE COATED PAPER | 105 | A4 | 2970 | 2100 | ONE-SIDE COATED PAPER | PUNCHED PAPER | WHITE |
| OHP PAPER | 80 | A4 | 2970 | 2100 | OHP PAPER | FEATURE | TRANSPARENT |

PRINT CONTROL APPARATUS, CONTROL METHOD FOR CONTROLLING PRINT CONTROL APPARATUS, AND RECORDING MEDIUM

BACKGROUND OF THE INVENTION

Field of the Invention

The present disclosure relates to a print control apparatus, a control method for controlling a print control apparatus, and a recording medium.

Description of the Related Art

Conventionally, a printing apparatus can perform a printing process using various sheets different in the size, the basis weight, or the paper type, such as coated paper or high-quality paper, of a sheet.

As a method for setting a sheet to be used when the printing process is performed, a method for performing the setting through an operation unit of the printing apparatus is known.

In the publication of Japanese Patent Application Laid-Open No. 2006-88513, it is possible to set in advance whether a user is to be requested to set a sheet attribute in a case where any of sheet feeding trays of an image forming unit is opened and closed. Then, if the user is to be requested to set a sheet attribute, then to match a sheet attribute indicated by the user and a sheet attribute of a sheet held in a sheet feeding tray, the sheet feeding tray as a target is set to unusable until the user sets the sheet attribute.

There is a method for, when a sheet in a sheet holding unit is replaced, changing a setting of sheet information of the sheet held in the sheet holding unit first and then holding in the sheet holding unit a sheet corresponding to the sheet information of which the setting is changed.

In the configuration of the publication of Japanese Patent Application Laid-Open No. 2006-88513, if a setting of sheet information of a sheet held in a sheet holding unit is changed first, the sheet holding unit is not set to unusable after the setting is changed and before a sheet corresponding to the sheet information of which the setting is changed is held in the sheet holding unit.

Thus, if the user starts printing during the period after the setting of the sheet information is changed and before the sheet corresponding to the sheet information of which the setting is changed is held, the sheet information does not match the sheet. Thus, a paper jam or an image quality defect may occur.

SUMMARY OF THE INVENTION

According to an aspect of the present invention, a print control apparatus to communicate with a printing apparatus having a plurality of sheet holding units configured to hold sheets to be used for printing, wherein the printing apparatus is for conveying a sheet held in each of the plurality of sheet holding units and printing an image on the sheet, includes a storage unit configured to store sheet information of the sheets, wherein the sheets are held in a different one of the plurality of sheet holding units, a reception unit configured to receive sheet information of a sheet held in a sheet holding unit selected from the plurality of sheet holding units, a change unit configured to change the sheet information stored in the storage unit, and an instruction unit configured to instruct the printing apparatus, wherein, in a case where the sheet information stored in the storage unit of the sheet held in the selected sheet holding unit is changed to the received sheet information, the instruction unit instructs the printing apparatus not to use the sheet held in the selected sheet holding unit for printing.

Further features will become apparent from the following description of embodiments with reference to the attached drawings.

BRIEF DESCRIPTION OF THE DRAWINGS

FIGS. 6A and 6B are diagrams each illustrating a screen of a sheet management application.

FIG. 9 is a diagram illustrating a screen of the sheet management application.

DESCRIPTION OF THE EMBODIMENTS

Figure 1:
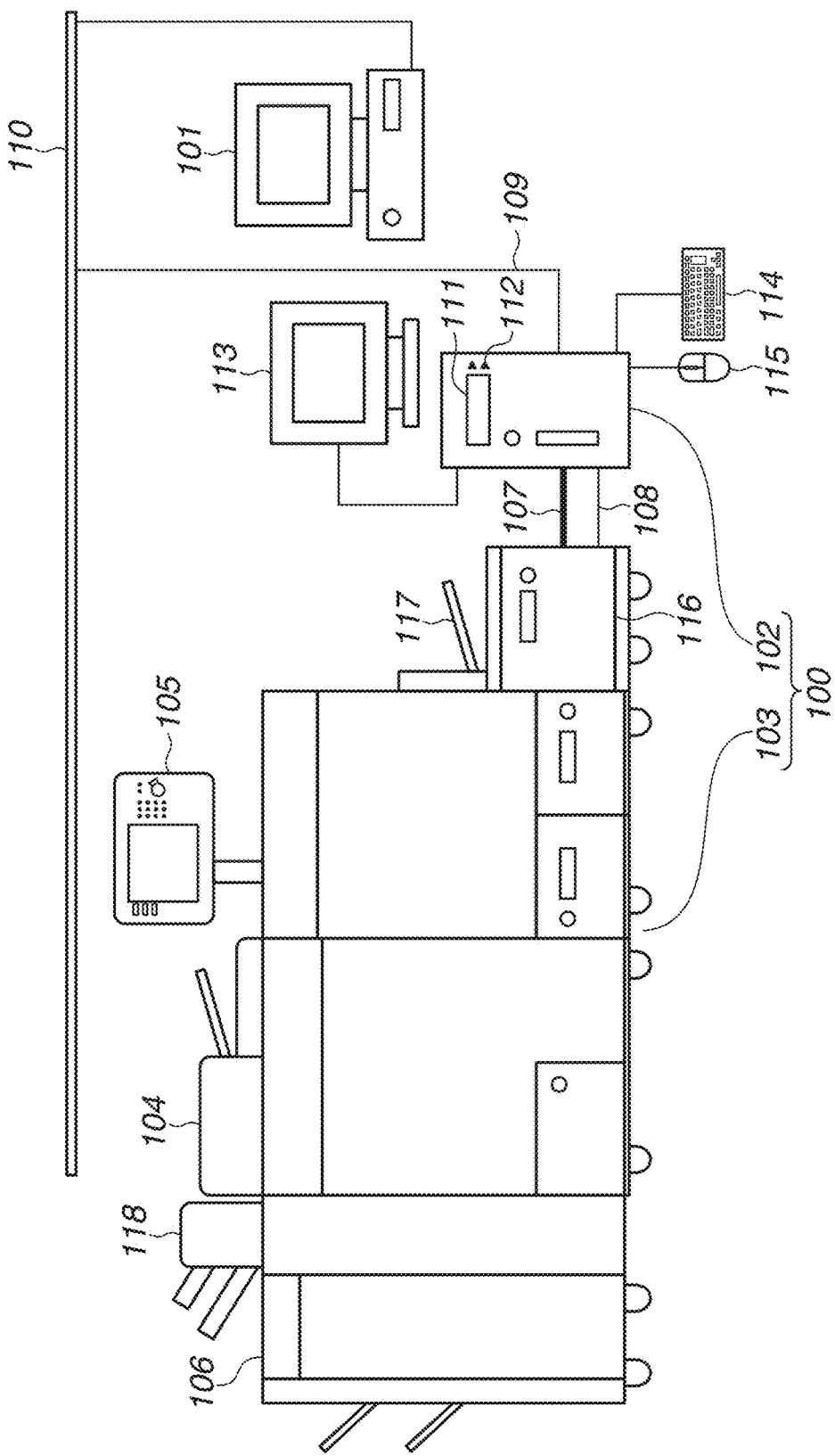
FIG. 1 is a block diagram illustrating a configuration of an image forming system.

FIG. 1 is a block diagram illustrating the configuration of an image forming system 100 according to a first embodiment. In FIG. 1, the image forming system 100 includes a printing apparatus 103 and a print control apparatus 102.

Then, the image forming system 100 is connected to a client computer 101 so that the image forming system 100 can communicate with the client computer 101. The client computer 101 and the print control apparatus 102 are connected together via a local area network (LAN) 110 using an Ethernet (registered trademark) cable 109 so that the client computer 101 and the print control apparatus 102 can communicate with each other. Further, the print control apparatus 102 and the printing apparatus 103 are connected together via an image video cable 107 and a control cable 108.

In the present embodiment, the printing apparatus 103 is not directly connected to the LAN 110. The printing apparatus 103 and the client computer 101 communicate with each other via the print control apparatus 102. Alternatively, the printing apparatus 103 can be directly connected to the LAN 110.

The client computer 101 starts an application and gives a print instruction to the image forming system 100.

The print control apparatus 102 performs image processing with the printing apparatus 103. The printing apparatus 103 is a multifunction peripheral having various functions. The printing apparatus 103 is capable of not only performing image processing according to an instruction from the client computer 101 or the print control apparatus 102, but also copying data read from a scanner 104 or transmitting the data to a shared folder.

When the scanner 104 scans an image, an operation unit 105 receives various instructions from a user through various keys. Further, the operation unit 105 displays various pieces of information such as a scanning state on a panel. A post-processing device 106 receives a sheet on which an image is formed, performs post-processing on the sheet, and discharges the sheet.

The printing apparatus 103 includes a long deck 116, which is a paper deck capable of holding a long sheet, a manual-bypass tray 117, and an inserter 118. A display unit 111 displays information in the print control apparatus 102. An operation button unit 112 is a hardware operation button of the print control apparatus 102. The operation button unit 112 is operated, whereby an operation regarding the information displayed on the display unit 111 is performed. The information displayed on the display unit 111 is used to display minimum required information (the operation of power supply or the confirmation of an Internet Protocol (IP) address) for operating the print control apparatus 102.

A display device 113 is a device such as a liquid crystal monitor included in the print control apparatus 102. A keyboard 114 and a pointer device 115 are used to operate the print control apparatus 102. In the present embodiment, the print control apparatus 102 and the printing apparatus 103 are different apparatuses. Alternatively, the processing of the print control apparatus 102 can be included in the printing apparatus 103, and the print control apparatus 102 is not needed to be physically placed. Yet alternatively, the display device 113 can be configured to have a position input function as in a touchpad and have the function of the pointer device 115.

Figure 2:
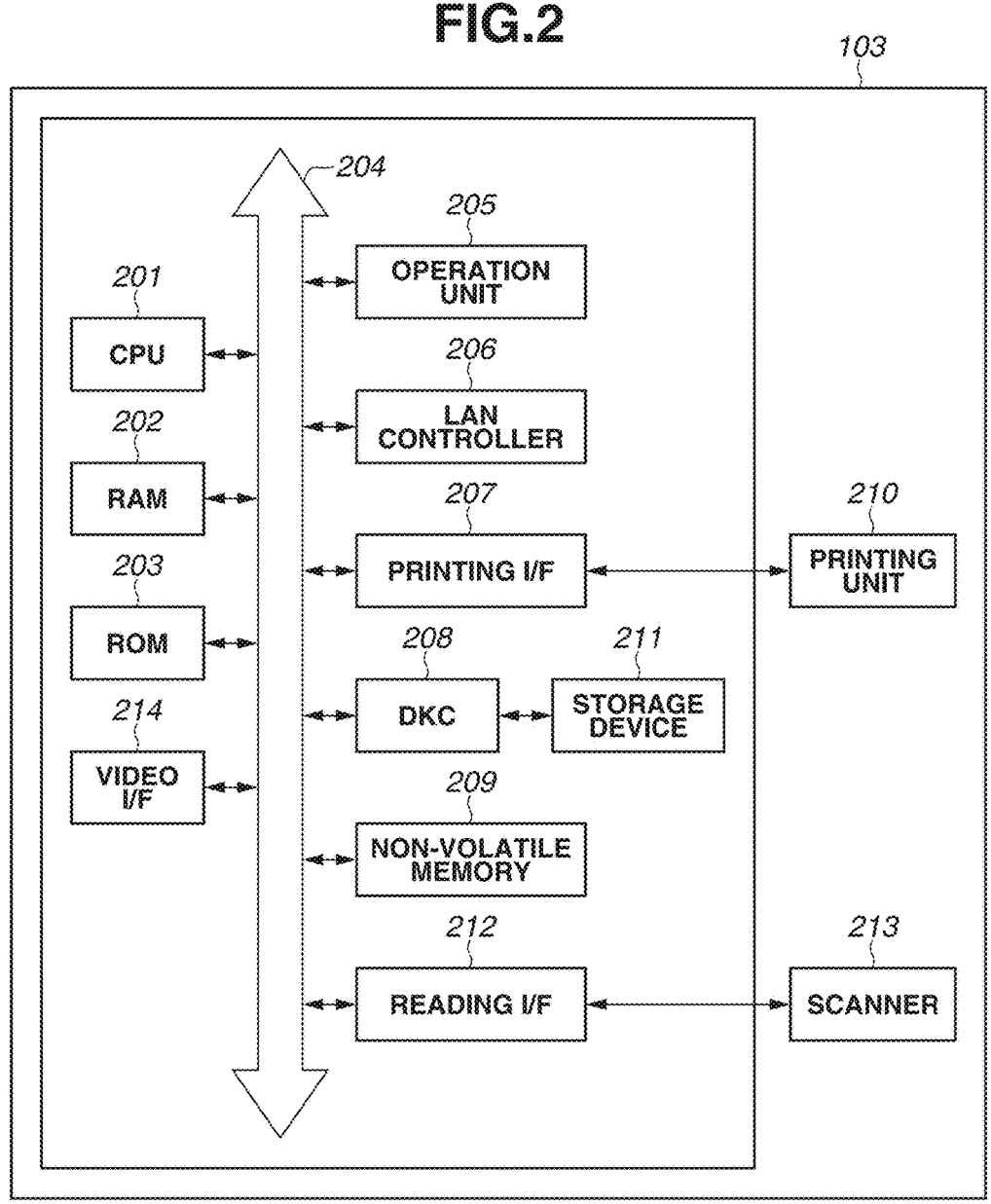
FIG. 2 is a block diagram illustrating a hardware configuration of a printing apparatus.

FIG. 2 is a block diagram illustrating the hardware configuration of the printing apparatus 103.

A central processing unit (CPU) 201 controls the operation of the entirety of the printing apparatus 103.

A LAN controller 206 is connected to the LAN 110. The CPU 201 can perform a communication process with the print control apparatus 102 via the LAN controller 206.

A random-access memory (RAM) 202 functions as a main memory or a work area for the CPU 201.

A storage device 211 is composed of a hard disk drive (HDD), a solid-state drive (SSD), or an integrated circuit (IC) card. The storage device 211 is used as a job storage area for storing an application program, font data, and form data, temporarily spooling a print job, or externally controlling a spooled job. A program stored in the storage device 211 is loaded into the RAM 202 and executed by the CPU 201.

Further, the storage device 211 is also used as a box data storage area. The storage device 211 holds image data read from a scanner 213 or image data of a print job as box data, references the image data via the network, or prints the image data. In the present embodiment, an HDD is used as the storage device 211 and holds various logs such as a job log and an image log.

A disk controller (DKC) 208 controls access to the storage device 211. A read-only memory (ROM) 203 functions as a boot ROM and stores a boot program for the printing apparatus 103.

An operation unit 205 includes a software key or a hardware key. Various pieces of information are input to the operation unit 205 by the user operating the software key or the hardware key.

A non-volatile memory 209 stores various pieces of setting information set by a terminal via the operation unit 205 or a network.

A video interface (I/F) 214 receives image data from the print control apparatus 102.

The LAN controller 206 is connected to the LAN 110, and inputs and outputs image data and other information via the LAN 110.

A printing I/F 207 is connected to a printing unit (hereinafter, "printer engine") 210 and the CPU 201. The CPU 201 outputs an image signal as output information to the printer engine 210 via the printing I/F 207.

A reading I/F 212 is connected to the scanner 213 and the CPU 201. The CPU 201 controls an image signal input from the scanner 213 via the reading I/F 212.

The CPU 201, the RAM 202, the ROM 203, the video I/F 214, the operation unit 205, the LAN controller 206, the printing I/F 207, the DKC 208, the non-volatile memory 209, and the reading I/F 212 are connected to a system bus 204. The CPU 201 controls access to and from various devices via the system bus 204.

Figure 3:
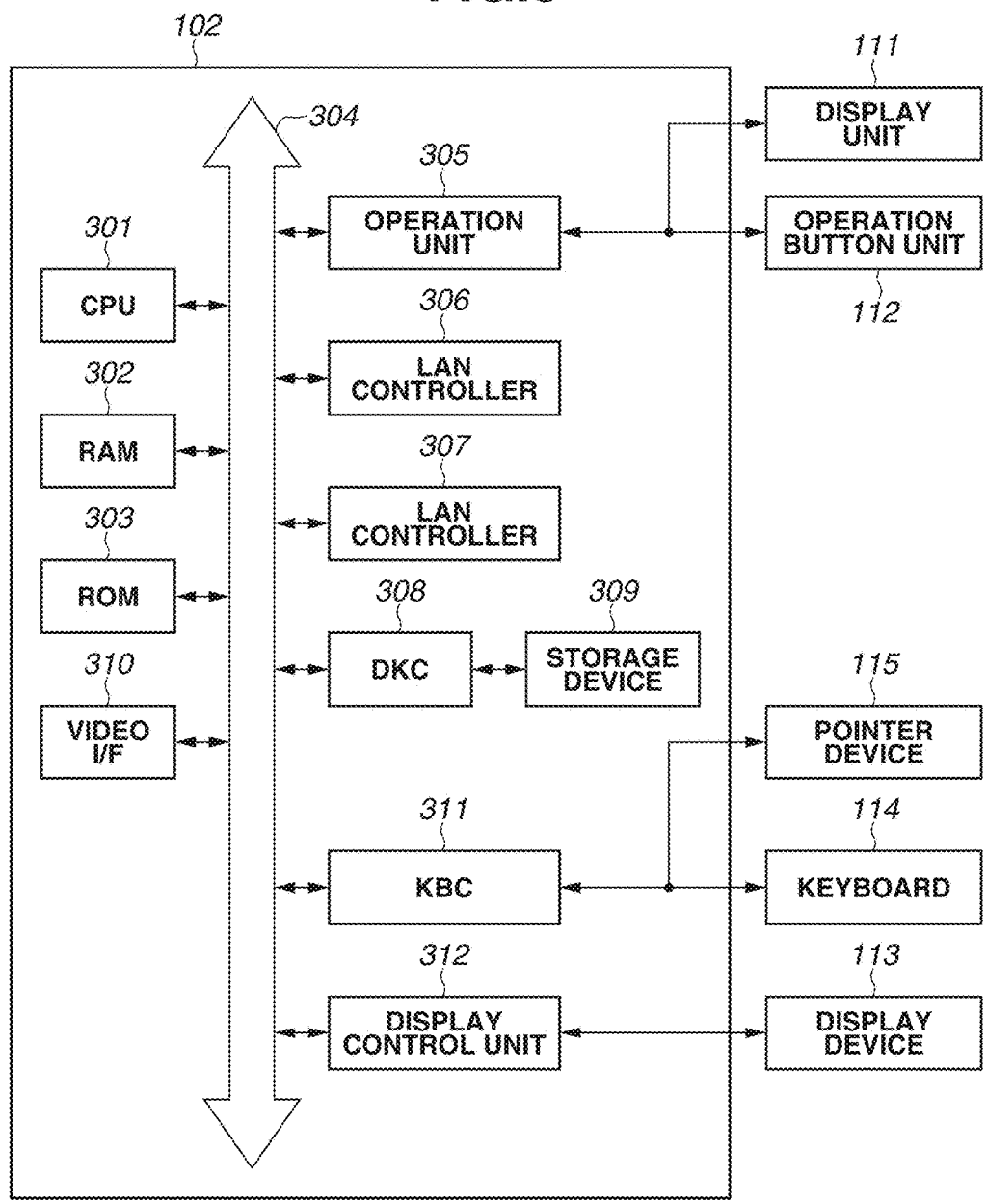
FIG. 3 is a block diagram illustrating a hardware configuration of a print control apparatus.

FIG. 3 is a block diagram illustrating the hardware configuration of the print control apparatus 102.

A CPU 301 controls the operation of the entirety of the print control apparatus 102. For example, the CPU 301 performs use control for controlling whether to make a sheet holding unit usable or unusable.

A LAN controller 306 is connected to the LAN 110. The CPU 201 can perform a communication process with the printing apparatus 103 via the LAN controller 306.

A LAN controller 307 is connected to the LAN 110. The CPU 201 can perform a communication process with the client computer 101 and the printing apparatus 103 on a network via the LAN controller 307.

A RAM 302 functions as a main memory or a work area for the CPU 301.

A storage device 309 includes an HDD, an SSD, or an IC card. The storage device 309 is used as a job storage area for storing, for example, an application program, font data, and form data, temporarily spooling a print job, or externally controlling a spooled job. A program stored in the storage device 309 is loaded into the RAM 302 and executed by the CPU 301.

The spooled job is subjected to a raster image processor (RIP) process. Then, the storage device 309 is used as a job storage area for saving RIP-processed image data again.

A DKC 308 controls access to the storage device 309. A ROM 303 functions as a boot ROM and stores a boot program for the printing apparatus 103.

An operation unit 305 includes the operation button unit 112 and the display unit 111. Various pieces of information are input to the operation unit 305 by the user operating the operation button unit 112. The input information is displayed on the display unit 111.

A video I/F 310 outputs RIP-processed image data to the printing apparatus 103. A keyboard controller (hereinafter, "KBC") 311 performs processing regarding the input of information from the keyboard 114 or the pointer device 115, such as a mouse (registered trademark).

A display control unit 312 includes a memory (hereinafter, a "video memory") therewithin. According to an instruction received from the CPU 301, the display control unit 312 holds image data in the video memory and outputs the held image data as a video signal to the display device 113.

The CPU 301, the RAM 302, the ROM 303, the video I/F 310, the operation unit 305, the LAN controller 306, the LAN controller 307, the DKC 308, the storage device 309, the KBC 311, and the display control unit 312 are connected to a system bus 304. The CPU 301 controls access to and from various devices via the system bus 304.

Figure 4:
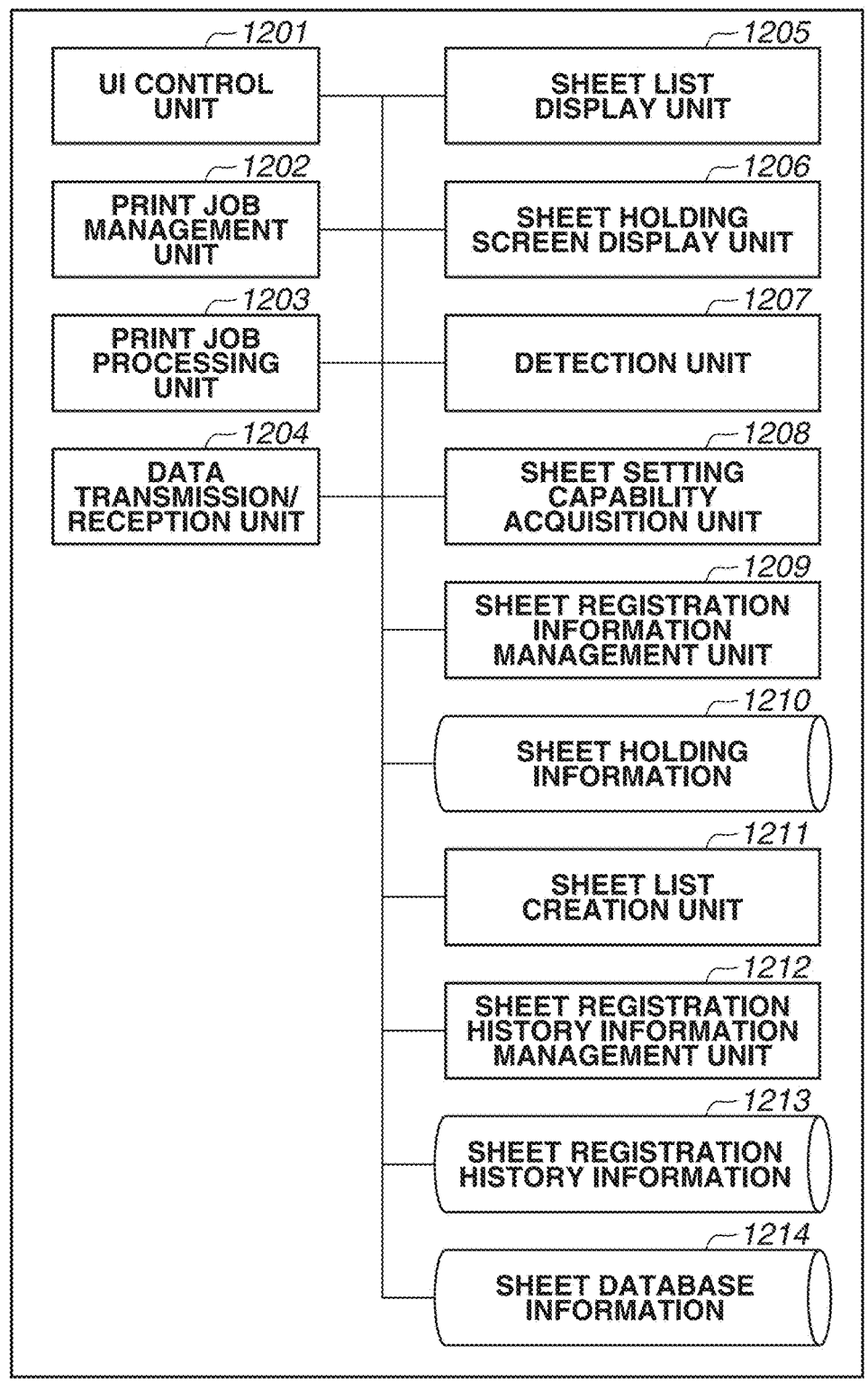
FIG. 4 is a block diagram illustrating a software configuration of the print control apparatus.

FIG. 4 is a block diagram illustrating the software configuration of the print control apparatus 102. These software modules are stored as programs in the storage device 309 and are loaded into the RAM 302 and executed by the CPU 301.

A user interface (UI) control unit 1201 controls display on the display unit 111 and the display device 113 via the operation unit 305 and the display control unit 312. Further, the UI control unit 1201 controls the input of various pieces of setting information set using the operation button unit 112, the keyboard 114, and the pointer device 115.

A print job management unit 1202 manages print job data received from the user. Specifically, the print job management unit 1202 performs the processes of calling print job data saved in the storage device 309, reflecting a change in a setting of a print job made by the user, and managing the history of printed jobs. A print job processing unit 1203 performs processing required for the execution of a printing process, such as the analysis of a print job received from the user, the generation of image data, and image compression and decompression.

A data transmission/reception unit 1204 manages the transmission and reception of various pieces of data to and from the printing apparatus 103. The data transmission/reception unit 1204 transmits print job data generated by the print job processing unit 1203 to the printing apparatus 103. Further, the data transmission/reception unit 1204 also manages the transmission and reception of data to and from the client computer 101, which is connected to the print control apparatus 102 via an external network.

A sheet list display unit 1205 displays sheet information as a sheet list on a top screen of a sheet management application displayed on the display device 113. The sheet management application is an application capable of managing the characteristics, such as the types, the sizes, and the basis weights, of sheets that can be used in the printing apparatus 103, and setting adjustment items for each sheet. The values of the adjustment items set here are recorded as sheet information.

The sheet list display unit 1205 switches the display of the display device 113 every time the sheet list as a display target is updated. In the present embodiment, using the sheet management application, the user can set which sheet holding unit a sheet is to be held in and which sheet information the sheet is based on.

A sheet list creation unit 1211 creates a sheet list to be displayed by the sheet list display unit 1205. The sheet list creation unit 1211 creates the sheet list to be displayed in descending order of the number of times the user registers sheet information in each sheet holding unit. The details of processing regarding the creation of the sheet list will be described below.

Sheet registration history information 1213 is information indicating in which sheet holding units pieces of sheet information stored in a sheet database are registered, and how many times the pieces of sheet information are registered in the sheet holding units. This information is used by the sheet list creation unit 1211 to create a sheet list.

A sheet registration history information management unit 1212 manages the sheet registration history information 1213. For example, according to the fact that the user selects sheet information from a sheet list and registers the sheet information in a sheet holding unit, the sheet registration history information management unit 1212 updates the sheet registration history information 1213. Sheet database information 1214 is a database for storing sheet information, such as the types, the sizes, and the basis weights of sheets that can be used in the printing apparatus 103. This database is stored in the storage device 309.

In the sheet database information 1214, sheet information registered in advance as the product specifications of the printing apparatus 103 and also sheet information created by the user performing a predetermined operation using the sheet management application are stored. Further, the same information is also stored in the printing apparatus 103. Thus, if the database of either of the printing apparatus 103 and the print control apparatus 102 is updated, the database of the other is also updated via the data transmission/reception unit 1204.

A sheet holding screen display unit 1206 controls the display of sheet holding unit buttons 406 to 411 in FIG. 6A. According to the fact that the user selects sheet information from a sheet list and registers the selected sheet information in a sheet holding unit, the sheet holding screen display unit 1206 displays the registered sheet information in a sheet holding button.

Figure 6B:
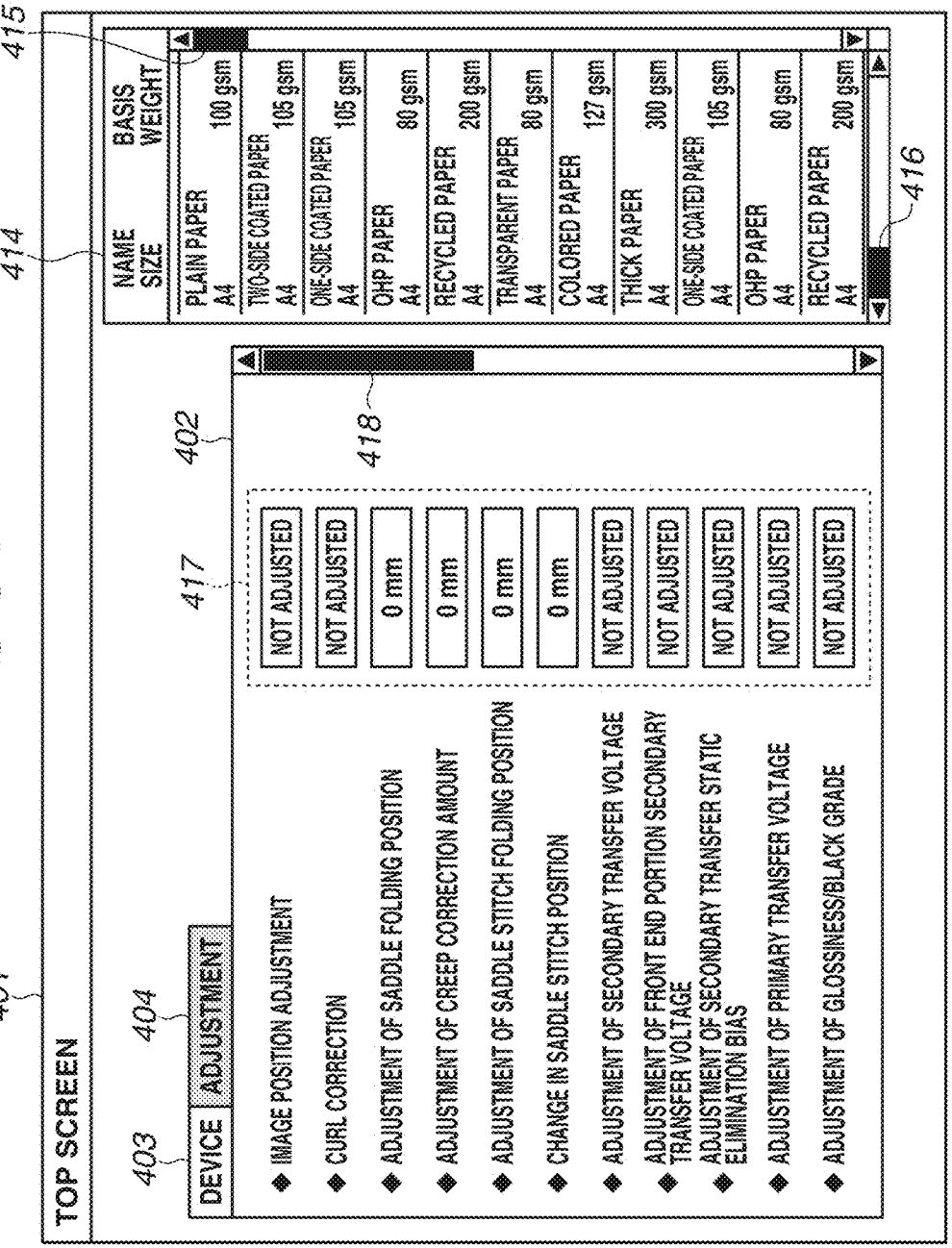

A detection unit 1207 detects a click operation using an operation unit, such as the pointer device 115, on a top screen 401 of the sheet management application in FIGS. 6A and 6B. The detection unit 1207 detects that the pointer device 115 is clicked. The detection unit 1207 also acquires information regarding the position where the click is performed.

A sheet setting capability acquisition unit 1208 inquires of the printing apparatus 103 about whether a sheet having sheet information selected by the user can be set in each sheet holding unit. Further, the sheet setting capability acquisition unit 1208 receives the result of the inquiry from the printing apparatus 103.

Sheet holding information 1210 stores sheet information registered in a sheet holding unit included in the printing apparatus 103. The sheet holding information 1210 stores sheet holding units and pieces of sheet information of sheets held in the sheet holding units in association with each other. For example, when the top screen 401 illustrated in FIG. 6A is displayed on the display device 113, the sheet holding information 1210 stores information indicating that sheet information such as one-side coated paper, A4, 100 Grams per Square Meter (gsm), and white is registered in a sheet holding deck 1, which is indicated by the sheet holding unit button 406.

According to an operation performed by the user using the keyboard 114 or the pointer device 115, a sheet holding information management unit 1209 updates the sheet holding information 1210. Further, when the sheet holding information 1210 is updated, the sheet holding information management unit 1209 synchronizes the sheet holding information 1210 with sheet holding information 1306 in FIG. 5, which is stored in the printing apparatus 103, via the data transmission/reception unit 1204.

Figure 5:
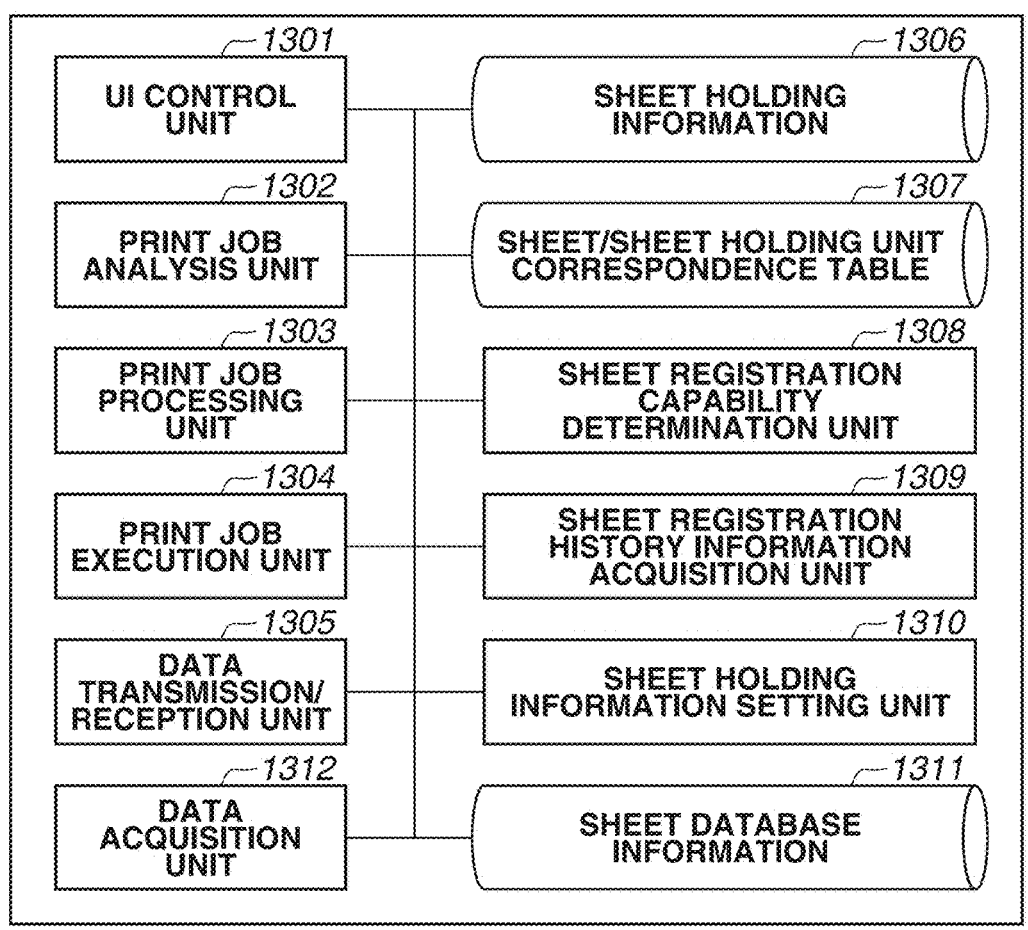
FIG. 5 is a block diagram illustrating a software configuration of the printing apparatus.

FIG. 5 is a block diagram illustrating the software configuration of the printing apparatus 103. These software modules are stored as programs in the storage device 211 and are loaded into the RAM 202 and executed by the CPU 201.

A UI control unit 1301 controls display on the operation unit 205 and input from the operation unit 205.

A print job analysis unit 1302 analyzes data of a print job received from the print control apparatus 102. A print job processing unit 1303 executes a printing process needed in the printing apparatus 103 on the print job. A print job execution unit 1304 controls a series of printing operations, such as sheet holding, sheet conveyance, printing, and sheet discharge, on the print job. Based on information of a sheet to be used, which is analyzed by the print job analysis unit 1302, and sheet holding information 1306, the print job execution unit 1304 identifies a sheet holding unit in which the sheet to be used is set. Then, the print job execution unit 1304 feeds the sheet from this tray. A data transmission/reception unit 1305 controls the transmission and reception of data to and from the print control apparatus 102.

The Sheet holding information 1306 stores the relationships between sheet holding units included in the printing apparatus 103 and pieces of sheet information registered in the sheet holding units. The sheet holding information 1306 is synchronized with the sheet holding information 1210, which is set using the sheet management application, whereby information of the sheet holding information 1306 is updated.

A sheet/sheet holding unit correspondence table 1307 is a table illustrating the relationships between the sheet holding units and sheets that can be set in the sheet holding units.

If an inquiry is received from the print control apparatus 102, a sheet registration capability determination unit 1308 references the sheet/sheet holding unit correspondence table 1307 and determines whether a sheet about which the inquiry is received can be set in each sheet holding unit.

A sheet holding information setting unit 1310 performs the processes of storing sheet information registered in each sheet holding unit and acquiring sheet information registered in each sheet holding unit.

If the sheet holding information 1306 is updated in the printing apparatus 103, a sheet registration history information acquisition unit 1309 acquires information of the updated sheet holding information 1306 and transmits the information to the print control apparatus 102 via the data transmission/reception unit 1305.

Sheet database information 1311 is similar to the sheet database information 1214 of the print control apparatus 102, and therefore is not described here. This database is stored in the storage device 211.

A data acquisition unit 1312 acquires model information and hardware option information of the printing apparatus 103 from the ROM 203 or the storage device 211 of the printing apparatus 103. According to a request from the print control apparatus 102, the acquired information is transmitted to the print control apparatus 102 via the data transmission/reception unit 1305.

In FIGS. 4 and 5, the sheet holding information 1210 and 1306 and the sheet database information 1214 and 1311 are stored in both the print control apparatus 102 and the printing apparatus 103, respectively. Alternatively, each of the sheet information and the sheet database information can be stored in either of the print control apparatus 102 and the printing apparatus 103.

With reference to FIGS. 6A and 6B, a screen of the sheet management application is described. FIGS. 6A and 6B each illustrate a top screen displayed on the display device 113 when the sheet management application starts. The sheet management application operates by the user starting the sheet management application on the print control apparatus 102.

FIG. 6A illustrates the screen in the state where the screen displays sheet information of sheets held in the sheet holding units of the printing apparatus 103. FIG. 6B illustrates the screen in the state where the screen displays buttons allowing the setting of various adjustment items of the printing apparatus 103. According to an instruction from the CPU 301, the top screen of the sheet management application is drawn in a video memory for the top screen, and image data drawn in the video memory is also output as a video signal to the display device 113, whereby the top screen is displayed.

A top screen 401 is an initial screen of the sheet management application. A display area 402 is an area of which the display contents can be changed using a device tab 403 and an adjustment tab 404. If the user presses the device tab 403, the screen in FIG. 6A, which displays the sheet information of the sheets set in the sheet holding units of the printing apparatus 103, is displayed in the display area 402.

When the sheet management application starts, the print control apparatus 102 acquires hardware option information of the printing apparatus 103, and displays a correct image according to the acquired option information.

FIG. 6A illustrates the state where a plurality of sheet holding decks (internal sheet holding decks), a long deck (an external sheet holding deck), a plurality of inserters, and a manual-bypass tray are attached as the sheet holding units, and a finisher is attached.

Sheet holding unit buttons 406 and 407 are sheet holding unit buttons for sheet holding decks 1 and 2, respectively. A sheet holding unit button 408 is a sheet holding unit button for the long deck. A sheet holding unit button 409 is a sheet holding unit button for the manual-bypass tray. Sheet holding unit buttons 410 and 411 are sheet holding unit buttons for inserters 1 and 2, respectively.

In the sheet holding unit buttons 406 to 411, the sheet information of the sheets set in the sheet holding units is displayed, and the sheet holding unit buttons 406 to 411 are displayed in a selectable manner on the top screen 401. Based on information of the sheet holding units of the printing apparatus 103 acquired when the sheet management application starts, the sheet management application creates and places sheet holding unit buttons.

A use assignment button 412 is placed in each of the sheet holding unit buttons 406 to 411. The use assignment button 412 has the state of a use assignment button 412A and the state of a use assignment button 412B, which are different in color from each other. The use assignment button 412A indicates a usable state, and the use assignment button 412B indicates an unusable state.

The user can press the use assignment button 412, to switch whether the sheet holding unit is usable (the state of the use assignment button 412A) or unusable (the state of the use assignment button 412B).

A sheet list display area 414 is an area where a sheet list based on the sheet information stored in the sheet database information 1214 is displayed.

In the columns, sheet information such as the size and the basis weight of a sheet is displayed. In the rows, the type of a sheet is displayed. To display sheet information other than that of the displayed sheets, the user operates a slider bar 416.

Further, to display sheets other than the displayed sheets, the user operates a slider bar 415. While the device tab 403 is selected, it is possible to simultaneously confirm both the sheet information of the sheets set in the sheet holding units, and a list of the pieces of sheet information stored in the sheet database information 1214.

FIG. 6B illustrates a screen for setting adjustment items regarding the sheet information displayed in the sheet list display area 414. An adjustment item list 417 is an area where buttons for setting various adjustment items are provided. Adjustment items that can be adjusted by the printing apparatus 103 are displayed. By operating a slider bar 418, the user can confirm the settings of adjustment items that are not currently displayed.

Using the top screen 401 of the sheet management application, the user registers sheet information of a sheet held in a sheet holding unit. The user selects the device tab 403. The user places a cursor of the pointer device 115 at sheet information of a sheet to be selected and presses a button of the pointer device 115. Sheet information that can be selected is the sheet information displayed in the sheet list or the sheet information currently registered in the sheet holding unit buttons 406 to 411.

While holding down the button of the pointer device 115 with the cursor placed at the sheet information to be selected, the user moves the cursor to the position where a sheet holding unit button for setting the sheet having the sheet information is displayed. After the cursor moves to the position of the sheet holding unit button in which the sheet information is to be registered, the user releases the button of the pointer device 115.

In this manner, when the user releases the button of the pointer device 115, the user can register the selected sheet information in the sheet holding unit indicated by the cursor. After registering the sheet information in the sheet holding unit, the user holds the sheet having the sheet information in the sheet holding unit.

To facilitate the understanding of the state where a sheet holding unit is unusable, the display of a sheet holding unit button on the sheet management application can be changed. For example, the display of the sheet holding unit is changed, whereby the sheet name is displayed in gray or the sheet holding unit button is displayed in pale pink.

Further, even in the state where a sheet holding unit is unusable, display can be performed differently depending on the state where the sheet holding unit is made unusable by pressing the use assignment button 412 and the state where the sheet holding unit is made unusable by selecting the sheet holding unit button and making sheet settings.

Figure 7:
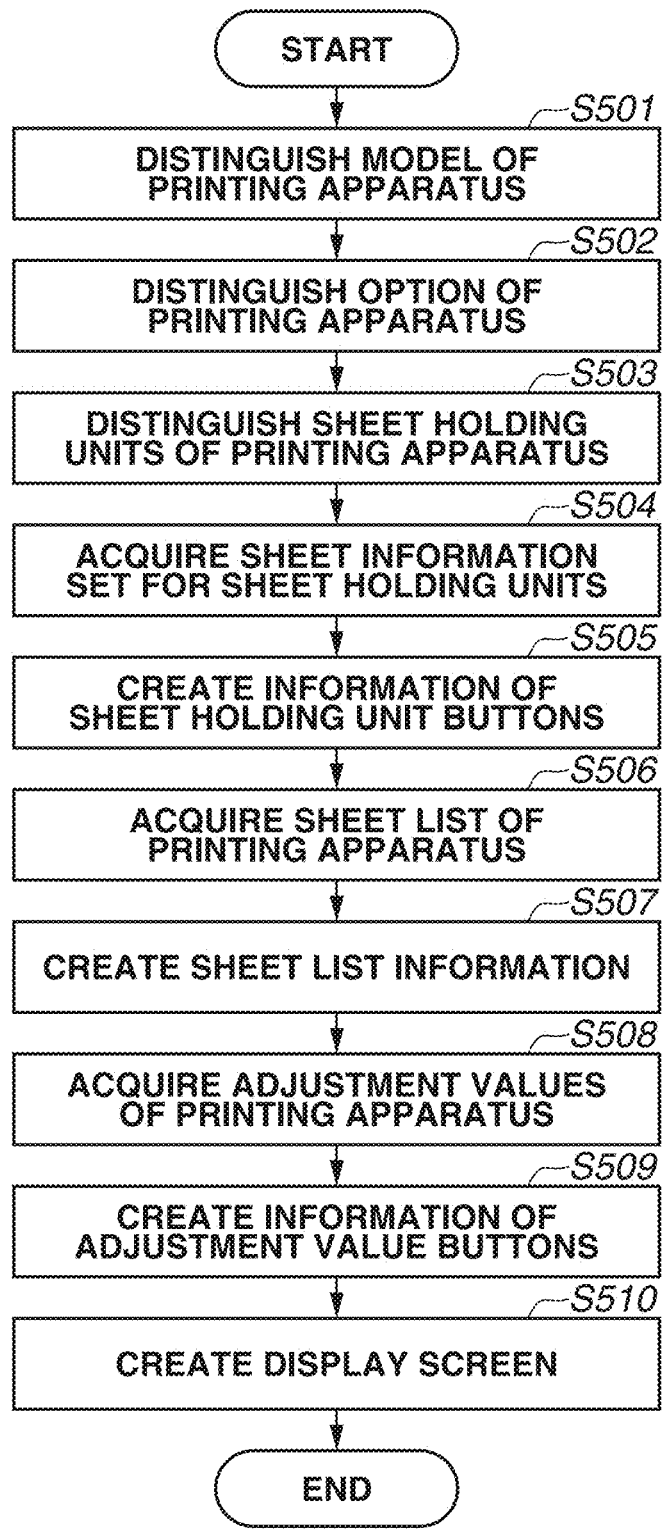
FIG. 7 is a flowchart when the sheet management application starts.

FIG. 7 illustrates processing performed when the print control apparatus 102 starts the sheet management application. A program for executing processing regarding a flowchart in FIG. 7 is stored in the storage device 309 in FIG. 3, loaded into the RAM 302, and executed by the CPU 301.

If the sheet management application starts, then in step S501, the sheet management application distinguishes the model of the printing apparatus 103 as a sheet management target. Specifically, the sheet management application communicates with the printing apparatus 103 and acquires model information. Then, based on model distinction information held in advance in the sheet management application, the sheet management application distinguishes the model of the printing apparatus 103.

After step S501, then in step S502, the sheet management application distinguishes hardware option information of a hardware option connected to the printing apparatus 103. Specifically, the sheet management application communicates with the printing apparatus 103 and acquires the hardware option information. Then, based on hardware option information held in advance in the sheet management application, the sheet management application distinguishes the acquired hardware option information.

After step S502, then in step S503, the sheet management application distinguishes sheet holding units connected to the printing apparatus 103 as the sheet management target and identifies the number of sheet holding units connected to the printing apparatus 103.

After step S503, then in step S504, the sheet management application communicates with the printing apparatus 103 and acquires sheet information set for each of the sheet holding units.

After step S504, then in step S505, the sheet management application creates information of the sheet holding unit buttons 406 to 411 to be displayed on a screen 405.

After step S505, then in step S506, the sheet management application communicates with the printing apparatus 103 and acquires sheet list information. The sheet list information is stored in the storage device 211 of the printing apparatus 103, and a sheet list stored in the printing apparatus 103 is synchronized with a sheet list stored in the print control apparatus 102.

After step S506, then in step S507, the sheet management application creates a sheet list to be displayed in the sheet list display area 414. Even by a method other than the above method, the process of creating a sheet list to be displayed on the display device 113 of the print control apparatus 102 can be performed. For example, in step S505, the data transmission/reception unit 1204 can synchronizes the sheet databases stored in the printing apparatus 103 and the print control apparatus 102. In step S506, based on the synchronized sheet databases, the sheet list creation unit 1211 can generate a sheet list.

After step S507, then in step S508, the sheet management application communicates with the printing apparatus 103 and acquires the adjustment values of various adjustment items using adjustment buttons included in the adjustment item list 417.

After step S508, then in step S509, based on the acquired adjustment values, the UI control unit 1201 creates a character string to be displayed in each of the adjustment buttons included in the adjustment item list 417. In a case where there is only one adjustment value, this adjustment value is displayed. In a case where there are two or more values, "adjusted" or "not adjusted" is displayed.

In step S510, the UI control unit 1201 creates the top screen 401 of the sheet management application using information in parentheses. Specifically, the top screen 401 includes the model information and the hardware option information of the printing apparatus 103 acquired in steps S501 and S502. Further, the top screen 401 includes the sheet holding unit button information created in step S505, the sheet list information created in step S507, and the adjustment button information created in step S509. Then, the created top screen 401 is displayed on the display device 113. Consequently, the screen illustrated in FIGS. 6A and 6B is generated.

Figure 8:
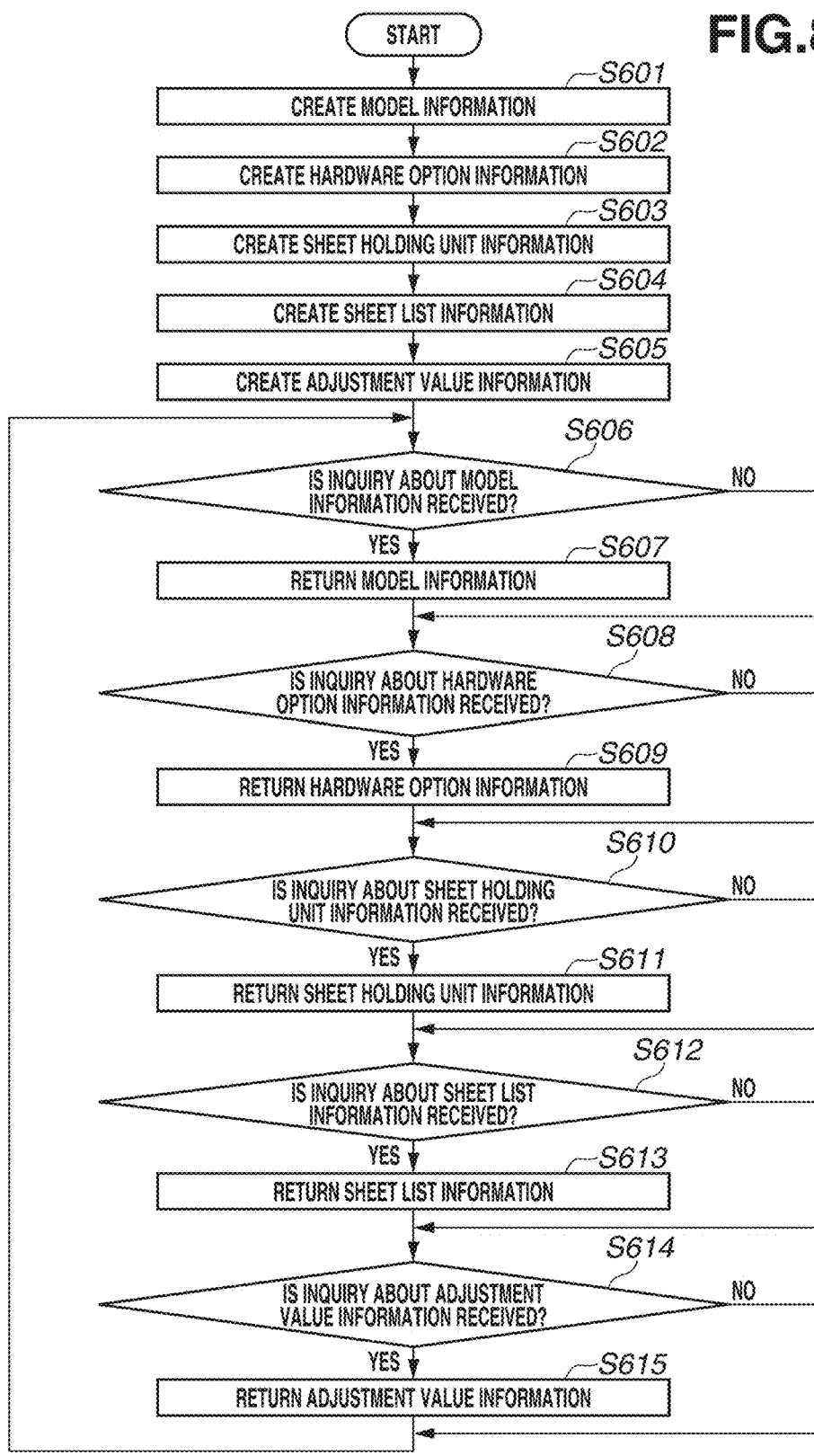
FIG. 8 is a flowchart when the printing apparatus starts.

With reference to a flowchart in FIG. 8, a description is given of the operation of the printing apparatus 103 when the print control apparatus 102 starts. A program for executing processing regarding the flowchart in FIG. 8 is stored in the storage device 211 in FIG. 2, loaded into the RAM 202, and executed by the CPU 201. The printing apparatus 103 is started, whereby the processing is started.

First, in step S601, the printing apparatus 103 acquires model information of the printing apparatus 103 from the storage device 211 and creates the model information as data that can be returned.

After step S601, then in step S602, the printing apparatus 103 acquires hardware option information of a hardware option connected to the printing apparatus 103 from the storage device 211 and creates the hardware option information as data that can be returned.

After step S602, then in step S603, the printing apparatus 103 creates data of sheet holding unit information from information regarding sheet holding unit information of the printing apparatus 103 and the hardware option information acquired in step S602.

After step S603, then in step S604, the printing apparatus 103 acquires sheet list information of the printing apparatus 103 from the storage device 211 and creates the sheet list information as data that can be returned.

After step S604, then in step S605, the printing apparatus 103 acquires adjustment value information of the printing apparatus 103 from the storage device 211 and creates the adjustment value information as data that can be returned. As the adjustment values, the adjustment values of all adjustment items that can be implemented by the printing apparatus 103 are acquired.

After step S605, then in step S606, the printing apparatus 103 determines whether an inquiry about the model information is received from the print control apparatus 102. In a case where an inquiry about the model information is received (YES in step S606), the processing proceeds to step S607. In a case where an inquiry about the model information is not received (NO in step S606), the processing proceeds to step S608.

If an inquiry about the model information is received, then in step S607, the printing apparatus 103 transmits the model information created in step S601 to the print control apparatus 102.

After step S607 or in a case where an inquiry about the model information is not received in step S606, then in step S608, the printing apparatus 103 determines whether an inquiry about the hardware option information is received from the print control apparatus 102.

In a case where an inquiry about the hardware option information is received in step S608 (YES in step S608), the processing proceeds to step S609. In a case where an inquiry about the hardware option information is not received (NO in step S608), the processing proceeds to step S610.

In a case where an inquiry about the hardware option information is received, then in step S609, the data transmission/reception unit 1305 transmits the hardware option information created in step S602 to the print control apparatus 102.

After step S609 or in a case where an inquiry about the hardware option information is not received in step S608, then in step S610, the printing apparatus 103 determines whether an inquiry about the sheet holding unit information is received from the print control apparatus 102.

In a case where an inquiry about the sheet holding information is received in step S610 (YES in step S610), the processing proceeds to step S611. In a case where an inquiry about the sheet holding information is not received (NO in step S610), the processing proceeds to step S612. At this time, In a case where an inquiry about the sheet holding information is received, then in step S611, the printing apparatus 103 transmits the sheet holding unit information created in step S603 to the print control apparatus 102, and the processing proceeds to step S612.

After step S611 or in a case where an inquiry about the sheet holding information is not received in step S610, then in step S612, the printing apparatus 103 determines whether an inquiry about the sheet list information is received from the print control apparatus 102.

In step S612, in a case where an inquiry about the sheet list information is received (YES in step S612), the processing proceeds to step S613. In a case where an inquiry about the sheet list information is not received (NO in step S612), the processing proceeds to step S614.

In a case where an inquiry about the sheet list information is received, then in step S613, the printing apparatus 103 transmits the sheet holding unit information created in step S604 to the print control apparatus 102, and the processing proceeds to step S614.

After step S613 or in a case where an inquiry about the sheet list information is not received in step S612, then in step S614, the printing apparatus 103 determines whether an inquiry about the adjustment value information is received from the print control apparatus 102.

In step S614, in a case where an inquiry about the adjustment value information is received (YES in step S614), the processing proceeds to step S615. In a case where an inquiry about the adjustment value information is not received (NO in step S614), the processing returns to step S606.

In a case where an inquiry about the adjustment value information is received, then in step S615, the printing apparatus 103 transmits the adjustment value information created in step S605 to the print control apparatus 102.

After step S615 or in a case where an inquiry about the adjustment value information is not received in step S614, the processing returns to step S606.

FIG. 9 is a sheet setting screen for the sheet holding deck 1. According to an instruction from the CPU 301, the sheet setting screen for the sheet holding deck 1 is drawn in a video memory for the sheet setting screen, and image data drawn in the video memory is also output as a video signal to the display device 113, whereby the sheet setting screen is displayed.

A top screen 701 is an initial screen of the sheet setting screen for the sheet holding deck 1. On the top screen 701, a sheet information display area 702, a sheet list display area 703, an assignment button 704, a sheet list update button 705, and a "close" button 706 are displayed.

In the sheet information display area 702, setting information of a currently selected sheet is displayed. When the sheet holding unit button 406 is pressed, and the top screen 701 opens, information of a sheet currently assigned to the sheet holding deck 1 is displayed.

In the sheet list display area 703, a list of pieces of sheet information managed by the print control apparatus 102 and the printing apparatus 103 is displayed. If a sheet is selected from the sheet list displayed in the sheet list display area 703, information of the selected sheet is displayed in the sheet information display area 702.

First, input items in the sheet information display area 702 are described. A text field 707 is an area where the name of a sheet can be input. To change the name described in the text field 707, characters can be input to a text area using the keyboard 114. In the following descriptions, a description such as "the keyboard 114 and the like is used when an input is provided" will be omitted.

The sheet list update button 705 is pressed to reflect changed information on sheet information of the print control apparatus 102 and the printing apparatus 103. The same applies to a case where a setting is changed after that.

A text field 708 is an area where the basis weight can be input. The operation of the text field 708 is similar to that of the text field 707, and therefore is not described here.

A combo box 709 is an area where size information of the sheet is displayed. A desired size can be selected from size information displayed in a list and can be set. A combo box 710 is an area where surface property information is displayed. A combo box 711 is an area where feature information is displayed. A combo box 712 is an area where color information is displayed. A combo box 713 is an area where second-side-of-two-sides information is displayed. A combo box 714 is an area where fiber direction information is displayed. The operations of the combo boxes 710, 711, 712, 713, and 714 are similar to that of the combo box 709, and therefore are not described here.

A setting area 715 is an area where adjustment-related settings are displayed together. In this case, some adjustment items are illustrated as examples. To confirm the setting of an adjustment item that is not currently displayed when there are many adjustment items in the setting area 715 as in FIG. 9, the user operates a slider bar 716 and thereby can display the setting value of the adjustment item.

A setting item button 717 is a button for setting an image position adjustment and indicates whether the current sheet is already adjusted. In a case where the current sheet is already adjusted, the setting item button 717 indicates "adjusted". In a case where the current sheet is not adjusted, the setting item button 717 indicates "not adjusted". The setting item button 717 is pressed, whereby an adjustment screen opens. Then, various adjustment values can be input on the adjustment screen.

A setting item button 718 is a button for setting curl correction. A setting item button 719 is a button for adjusting a saddle folding position. In the setting item button 719, the current adjustment value is displayed, for example, in millimeters.

A setting item button 720 is a button for adjusting a creep correction amount. A setting item button 721 is a button for adjusting a saddle stitch folding position. A setting item button 722 is a button for adjusting a saddle stitch position. A setting item button 723 is a button for adjusting a secondary transfer voltage. A setting item button 724 is a button for adjusting a front end portion secondary transfer voltage.

A setting item button 725 is a button for adjusting a secondary transfer static elimination bias. A setting item button 726 is a button for adjusting a primary transfer voltage. The operations of the setting item buttons 718 to 726 are similar to that of the setting item button 717, and therefore are not described here.

Next, a sheet list display area 703 is described. A table 727 is a table displaying a sheet list. In the columns, sheet information of a sheet is set. In the rows, the type of a sheet is set. In each row, pieces of sheet information of each sheet are set.

To display sheet information other than that of the displayed sheets, the user operates a slider bar 728 and thereby can display the sheet information.

Further, to display sheets other than the displayed sheets, the user operates a slider bar 729 and thereby can display the sheets. A row 730 indicates parameters for the sheet displayed in the sheet information display area 702. The row 730 is highlighted so that it is understood that this sheet is currently selected.

Rows 731 to 733 indicate parameters of sheets that are not currently displayed in the sheet information display area 702. If any of the rows 731 to 733, which are not currently selected, is selected from the table 727 in the sheet list display area 703, information of the selected sheet is displayed in the sheet information display area 702. In this state, the user presses the assignment button 704 and thereby can assign the newly selected sheet to the sheet holding deck 1. To end the operation without changing anything, the user presses the "close" button 706.

Figure 10:
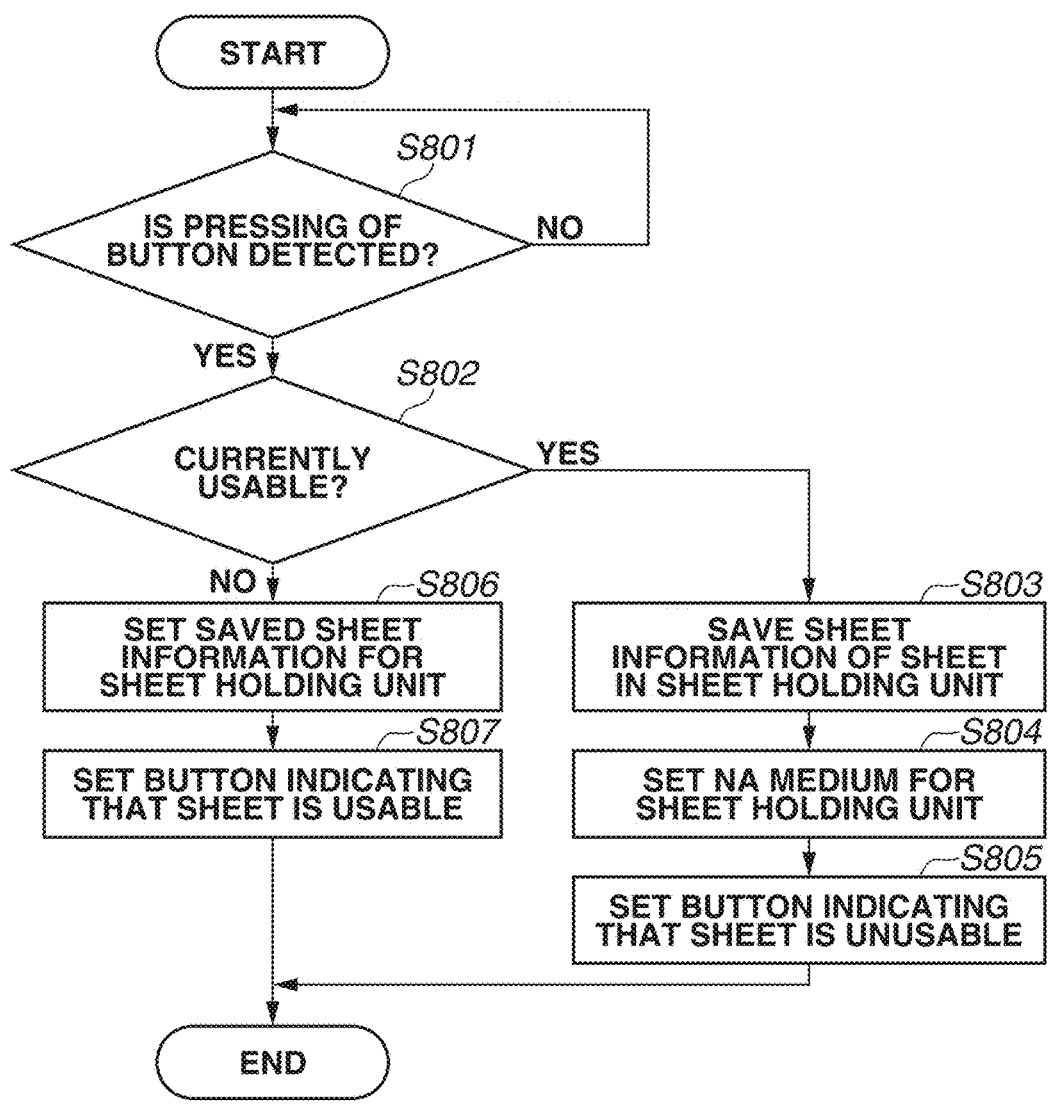
FIG. 10 is a flowchart illustrating a usability control process for a sheet holding unit.

With reference to a flowchart in FIG. 10, a description is given of a usability control process for a sheet holding unit in the image forming system 100.

In FIG. 10, a program for the print control apparatus 102 is stored in the storage device 309 in FIG. 3, loaded into the RAM 302, and executed by the CPU 301.

In step S801, the sheet management application determines whether the pressing of the use assignment button 412 displayed in the display area 402 in FIG. 6A (a software interrupt) is detected. In a case where the pressing of the use assignment button 412 for a predetermined sheet holding unit is detected (YES in step S801), the processing proceeds to step S802. In a case where the pressing of the use assignment button 412 for the predetermined sheet holding unit is not detected (NO in step S801), the processing returns to step S801.

In step S802, in a case where a sheet held in the predetermined sheet holding unit can be used for printing (YES in step S802), the processing proceeds to step S803.

In step S803, the sheet management application saves, in the RAM 302, sheet information of the sheet stored in the predetermined sheet holding unit. The saved sheet information will be used after the sheet held in the predetermined sheet holding unit is changed from usable to unusable in step S805, and when the pressing of the use assignment button 412 is detected in step S801 again, and the sheet is changed from unusable to usable in step S807.

In step S804, the sheet management application sets special sheet information indicating an NA (Not Assigned) medium for the predetermined sheet holding unit. The NA medium has sheet information such as "sheet ID: 0", "sheet size: absent", and "sheet type: absent". The sheet management application sets the sheet information of the NA medium for the sheet holding unit. Then, the sheet management application notifies the printing apparatus 103 that the NA medium is set.

Based on the received notification, the printing apparatus 103 sets the sheet information of the sheet held in the sheet holding unit. Consequently, if executing a print job in which a sheet name and a sheet holding unit are specified, the printing apparatus 103 enters a sheet-absent state because there are no corresponding sheet size and sheet type. As a result, the printing apparatus 103 enters the state where the sheet held in the sheet holding unit cannot be used.

In step S805, the sheet management application changes the display of the use assignment button 412A, which indicates that the sheet held in the predetermined sheet holding unit can be used, to the display of the use assignment button 412B, which indicates that the sheet cannot be used. If step S805 is completed, the flow ends. Then, the sheet management application returns to the state where the sheet management application waits for the pressing of the use assignment button 412 again.

In a case where the sheet held in the predetermined sheet holding unit cannot be used in step S802 (NO in step S802), the processing proceeds to step S806.

In step S806, the sheet management application sets the sheet information saved in step S803 for the predetermined sheet holding unit.

In step S807, the sheet management application changes the display of the use assignment button 412B, which indicates that the sheet held in the sheet holding unit cannot be used, to the display of the use assignment button 412A, which indicates that the sheet can be used. In this step, the print control apparatus 102 notifies the printing apparatus 103 that the sheet held in the sheet holding unit can be used. Then, the printing apparatus 103 allows the use of the sheet held in the sheet holding unit.

If step S807 is completed, the flow ends. Then, the sheet management application returns to the state where the sheet management application waits for the pressing of the use assignment button 412 again.

Figure 11:
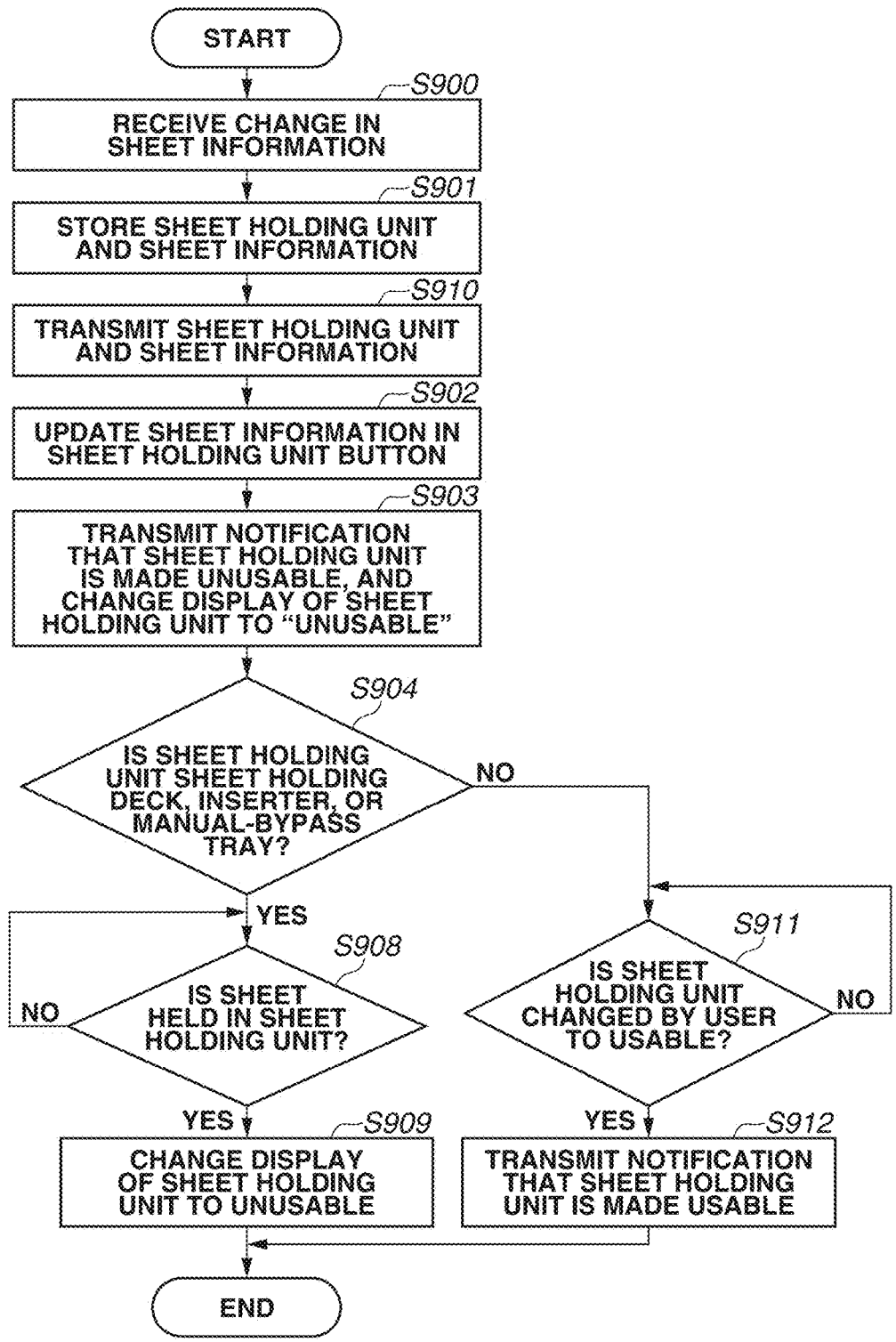
FIG. 11 is a flowchart illustrating a sheet setting process for a sheet holding unit performed by the sheet management application.

With reference to a flowchart in FIG. 11, a description is given of a sheet setting process for a sheet holding unit performed by the print control apparatus 102. In FIG. 11, a program for the print control apparatus 102 is stored in the storage device 309 in FIG. 3, loaded into the RAM 302, and executed by the CPU 301.

In step S900, the sheet management application receives a change in sheet information of a sheet held in a sheet holding unit selected by the user.

In step S901, the sheet management application stores the changed sheet information in the storage device 309. In step S910, the sheet management application transmits the received change to the printing apparatus 103.

In step S902, the sheet management application updates the sheet information of the sheet held in the sheet holding unit. Specifically, if the state of the sheet before sheet settings are made is the state of the top screen 401, the sheet management application changes the sheet name displayed in the sheet holding unit button 406 for the sheet holding deck 1 from "one-side coated paper" to "thick paper".

In step S902, the sheet management application updates the display of the sheet held in the selected sheet holding unit. Alternatively, in this step, the sheet management application can change the display of the sheet holding unit button to display indicating that the sheet is currently set. In step S909, however, the sheet management application will cancel the display of the sheet holding unit button indicating that the sheet is currently set.

In step S903, the sheet management application sets the NA medium as the sheet information of the sheet held in the sheet holding unit. In this manner, the sheet management application prohibits the use of the selected sheet holding unit and changes the display of the use assignment button 412A for the sheet holding unit of which the sheet information is changed, to the display of the use assignment button 412B. Then, the print control apparatus 102 instructs the printing apparatus 103 not to use the sheet held in the selected sheet holding unit.

In step S904, in a case where the sheet holding unit in which the sheet is to be changed is a sheet holding deck, an inserter, or a manual-bypass tray (YES in step S904), the processing proceeds to step S908.

In step S908, the sheet management application inquires of the printing apparatus 103 about whether a sheet is held in the sheet holding unit of which the sheet information is changed. Then, the sheet management application receives, from the printing apparatus 103, the result of detecting whether a sheet is held (detection reception).

In a case where the result that a sheet is not held in the sheet holding unit as a target is received (NO in step S908), then in step S908, the sheet management application waits for a change in the result of reception from the printing apparatus 103. In a case where the result that a sheet is held in the sheet holding unit as the target is received (YES in step S908), the processing proceeds to step S909.

In step S909, the sheet management application gives an instruction to the printing apparatus 103 to allow the printing apparatus 103 to use the sheet held in the sheet holding unit in such a manner that the state where the sheet held in the sheet holding unit cannot be used is switched to the state where the sheet can be used. Specifically, the sheet management application changes the sheet information of the sheet held in the sheet holding unit from the NA medium to the sheet information saved in the state where the sheet is usable (e.g., the sheet information saved in step S803 in FIG. 10). Then, the sheet management application changes the display of the use assignment button 412B for the sheet holding unit to the display of the use assignment button 412A. If step S909 is completed, the flow ends.

In a case where the sheet holding unit in which the sheet is to be changed is not a sheet holding deck, an inserter, or a manual-bypass tray in step S904 (NO in step S904), the processing proceeds to step S911.

In step S911, the sheet management application checks whether the sheet holding unit is changed by the user so that the sheet held in the sheet holding unit can be used. In a case where the sheet holding unit is not changed so that the sheet held in the sheet holding unit can be used (NO in step S911), the processing returns to step S911. In step S911, the sheet management application waits until the sheet holding unit can be used. In a case where, on the other hand, the sheet holding unit is changed so that the sheet held in the sheet holding unit can be used (YES in step S911), the processing proceeds to step S912.

The time when the sheet holding unit is changed by the user so that the sheet held in the sheet holding unit can be used is the time when the use assignment button 412B for the sheet holding unit is pressed, and the display of the use assignment button 412 changes to the display of the use assignment button 412A after step S903. This corresponds to, for example, a case where the sheet in the sheet holding unit does not need to be replaced, or a case where in the long deck 116, which is a sheet holding unit externally connected to the printing apparatus 103, settings and adjustments are made in this externally connected device.

In step S912, the sheet management application transmits to the printing apparatus 103 a notification that the sheet holding unit of which the sheet information is changed is made usable. If step S912 is completed, the flow ends.

In FIG. 11, as a method for making sheet settings for a sheet holding unit by the sheet management application, a method for selecting a sheet, changing settings, and specifying adjustment values on the top screen 701 for the sheet holding deck 1 is illustrated. Alternatively, a method for selecting a sheet holding unit to be set from the sheet list display area 414 may be used. In both cases, to set a sheet for a sheet holding unit, sheet information to be set and sheet holding unit information to be set are necessary, and the processing of the sheet management application is also necessary.

Figure 12:
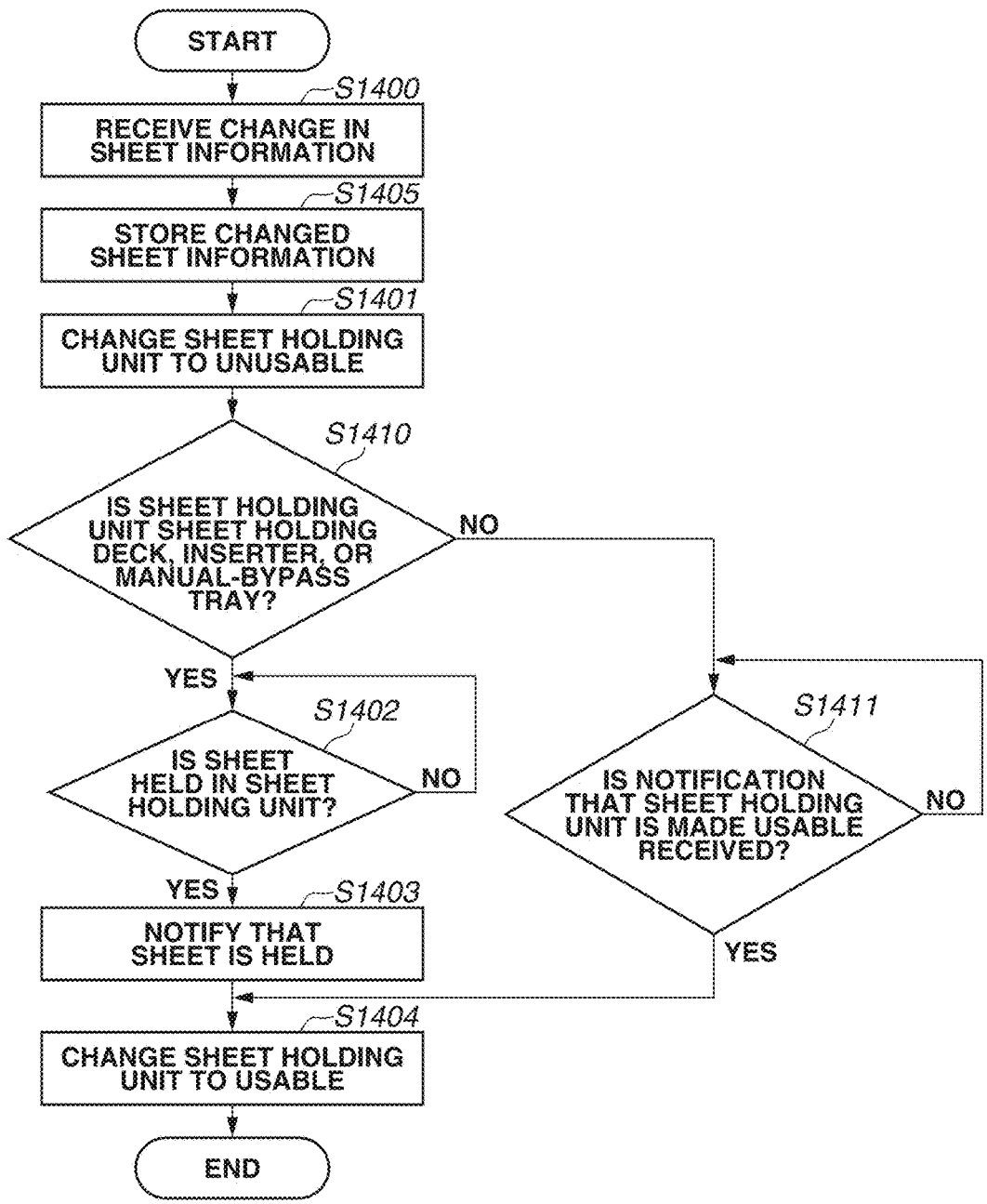
FIG. 12 is a flowchart illustrating a sheet setting process for a sheet holding unit performed by the printing apparatus.

With reference to a flowchart in FIG. 12, a description is given of a sheet setting process for a sheet holding unit performed by the printing apparatus 103. In FIG. 12, a program for the printing apparatus 103 is stored in the storage device 211 in FIG. 2, loaded into the RAM 202, and executed by the CPU 201.

In step S1400, the printing apparatus 103 receives a change in sheet information of a sheet held in a predetermined sheet holding unit, which is transmitted from the print control apparatus 102 to the printing apparatus 103 in step S910 in FIG. 11. In step S1405, the printing apparatus 103 stores the changed sheet information.

In step S1401, the printing apparatus 103 receives from the print control apparatus 102 a notification that the sheet held in the sheet holding unit regarding which the change in the sheet information is received is made unusable. Then, the printing apparatus 103 prohibits the use of the sheet held in the sheet holding unit.

The printing apparatus 103 prohibits the use of the sheet held in the sheet holding unit regarding which the change in the sheet information is received, whereby the printing apparatus 103 enters the state where the user cannot perform printing using the sheet in the sheet holding unit regarding which the change in the sheet information is received. Thus, it is possible to prevent a sheet in a sheet holding unit regarding which a change in sheet information is not completed from being used for printing.

In step S1410, the printing apparatus 103 determines whether the sheet holding unit regarding which the change is received is a sheet holding deck, an inserter, or a manual-bypass tray. In a case where the sheet holding unit regarding which the change is received is a sheet holding deck, an inserter, or a manual-bypass tray (YES in step S1410), the processing proceeds to step S1402.

In step S1402, the printing apparatus 103 detects whether, in a case where the processing proceeds to step S908 in FIG. 11, a sheet is held (placed) in the sheet holding unit regarding which the change is received. If the sheet holding unit regarding which the change is received is a sheet holding deck, the sheet holding deck is openable and closable, and therefore, an opening/closing detection sensor detects the opening and closing of the sheet holding deck. Specifically, if the opening/closing detection sensor detects that the sheet holding deck changes from a closed state to an open state, and also detects that the sheet holding deck changes from the opened state to the closed state, a sheet detection sensor detects whether a sheet is placed in the sheet holding deck.

Further, if the sheet holding unit regarding which the change is received is an inserter or a manual-bypass tray, the printing apparatus 103 detects whether the inserter or the manual-bypass tray changes from the state where a sheet is not held (placed) to the state where a sheet is held. If, however, the inserter or the manual-bypass tray detects the size of a held sheet, and even if the sheet is held before the sheet information is changed, then also in a case where the printing apparatus 103 detects that the sheet is replaced with a sheet corresponding to the changed sheet information, it is determined that a sheet is held.

In a case where a sheet is held (placed) in the sheet holding unit regarding which the change is received in step S1402 (YES in step S1402), the processing proceeds to step S1403.

In step S1403, the printing apparatus 103 transmits the detection result to the print control apparatus 102 (detection result transmission). Specifically, the printing apparatus 103 notifies the sheet management application that a sheet is held in the sheet holding unit regarding which the change is received. The detection result transmitted in this step is received by the print control apparatus 102 in step S908 in FIG. 11. After step S1403, the processing proceeds to step S1404.

In step S1404, the printing apparatus 103 changes the state where the sheet held in the sheet holding unit for which the change of the sheet information is received cannot be used to the state where the sheet can be used. Since the sheet held in the sheet holding unit for which the change of the sheet information is received is made usable, the user can perform printing using the sheet in the sheet holding unit. If step S1404 is completed, the flow ends.

In a case where, on the other hand, the sheet holding unit regarding which the change is received is not a sheet holding deck, an inserter, or a manual-bypass tray in step S1410 (NO in step S1410), the processing proceeds to step S1411.

In step S1411, in a case where a notification that the sheet holding unit is made usable in step S912 in FIG. 11 is received from the print control apparatus 102 (YES in step S1411), the processing proceeds to step S1404. In a case where the notification is not received (NO in step S1411), then in step S1411, the printing apparatus 103 waits until the notification is received. If step S1411 is completed, the processing proceeds to step S1404.

As described above, during the period after sheet information of a sheet held in a sheet holding unit is changed and before a sheet matching the changed sheet information is held in the sheet holding unit, the use of the sheet held in the sheet holding unit regarding which the change in the sheet information is received is prohibited.

Then, after the sheet matching the changed sheet information is held in the sheet holding unit, the use of the sheet held in the sheet holding unit regarding which the change in the sheet information is received is allowed. Consequently, in a case where, after sheet information of a sheet held in a sheet holding unit regarding which a change in the sheet information is received is changed, a sheet matching the changed sheet information is to be held in the sheet holding unit, it is possible to prevent the occurrence of a paper jam or an image quality defect.

In the present embodiment, a case has been described where the printing apparatus 103 and the print control apparatus 102 are different apparatuses. Alternatively, the printing apparatus 103 and the print control apparatus 102 can be configured as a single apparatus. In this case, the hardware configuration and the software configuration of the printing apparatus 103 include the hardware configuration and the software configuration of the print control apparatus 102.

Figure 13:
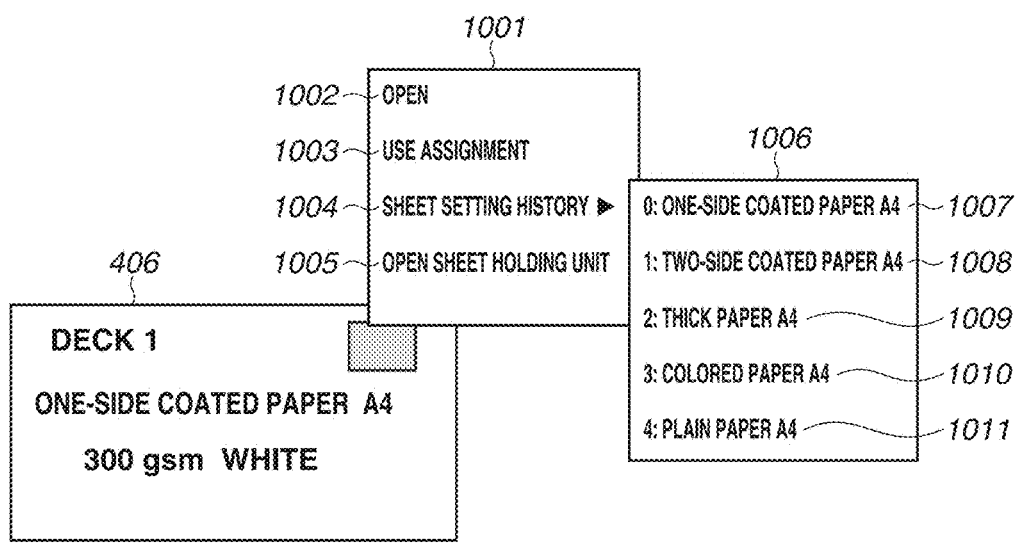
FIG. 13 is a diagram illustrating a context menu of a sheet holding unit button.

With reference to FIG. 13, an image forming system according to a second embodiment is described. FIG. 13 is an example of the display of sheet holding unit buttons. Portions having functions similar to those in FIGS. 1 to 12 are designated by the same numerals, and are not described in detail here.

The present embodiment is different from the first embodiment in a setting screen for sheet information. FIG. 13 illustrates a context menu displayed in a case where the details of sheet information of a sheet held in a sheet holding unit are displayed by operating the sheet holding unit button 406 using the pointer device 115. Specifically, the context menu is displayed by right-clicking the mouse.

A selection operation is performed by left-clicking the mouse. A context menu 1001 is displayed, including a menu 1002 for opening the sheet holding unit button 406, a menu 1003 for switching the use assignment of the sheet holding unit, and sheet setting history 1004 for opening the history of sheets set in the sheet holding unit. Further, the context menu 1001 is displayed, including a menu 1005 for opening the sheet holding deck 1 from the sheet management application, a sheet setting history sub-window 1006, and a sheet 1008, which is currently set for the sheet holding unit.

In the history of sheets set in the sheet holding unit in the past, a sheet 1007 is a sheet set most recently, and a sheet 1011 is a sheet set earliest in the history display illustrated in FIG. 13.

In the present embodiment, in the context menu 1001, which is displayed by pressing each of the sheet holding unit buttons 406 to 411 in FIG. 4A by a right click in the sheet management application, the sheet setting history 1004 is displayed, which is obtained when sheet information is set for the sheet holding unit in the past.

Then, as illustrated in FIG. 13, the sheet setting history 1004 is selected, whereby the sheet setting history sub-window 1006 opens. A sheet to be held in the sheet holding unit can be selected from the sheet setting history sub-window 1006. By such a sheet selection method, in a case where sheets to be used are already determined to some extent, it is possible to select a sheet more easily than selecting the sheet from a sheet list.

The sheet management application manages sheet setting history information with respect to each sheet holding unit and updates a sheet setting history list when allowing the use of the sheet held in the sheet holding unit in step S909 in FIG. 9.

Then, if the sheet setting history 1004 is selected, and a sheet is selected from the sheet setting history sub-window 1006, sheet information to be acquired from the sheet setting history list in step S901 is sheet information of the sheet selected from the sheet setting list.

As described above, in the present embodiment, it is possible to set a sheet for a sheet holding unit not only from a sheet list but also based on information of sheet history set for the sheet holding unit in the past.

Figure 14:
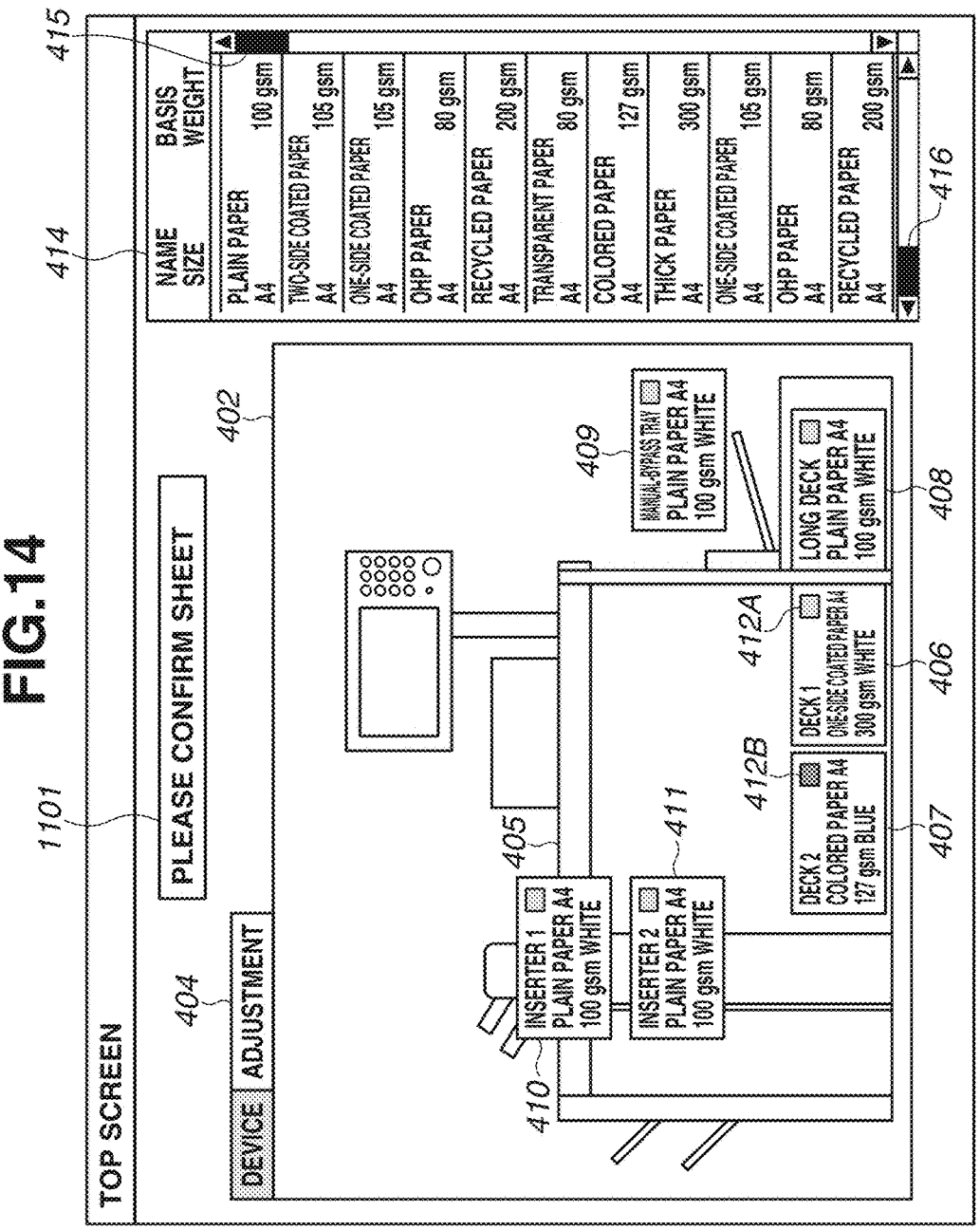
FIG. 14 is a diagram illustrating a screen of a sheet management application.

With reference to FIG. 14, an image forming system according to a third embodiment is described. FIG. 14 illustrates a top screen displayed on the display device 113 when the sheet management application starts. Portions having functions similar to those in FIGS. 1 to 13 are designated by the same numerals, and are not described in detail here.

In the first embodiment, sheet settings are made based on an action on a sheet holding unit when a sheet is set, namely the placement of a sheet in a sheet holding unit or the pressing of a use assignment button in a sheet holding button. The sheet management application, however, does not actually urge the user to replace a sheet. In the present embodiment, when sheet settings are made, the sheet management application performs the operation of urging the user to replace a sheet.

In FIG. 14, a message field 1101 is an area where a message related to the replacement of a sheet is displayed in the sheet management application. For example, the message field 1101 gives an error indication in a case where a sheet that cannot be set is specified.

After prohibiting the use of the sheet held in the sheet holding unit in step S903 in FIG. 9, the sheet management application displays a message "please confirm sheet" in the message field 1101. After the sheet management application sets the sheet held in the sheet holding unit to usable in step S909, or after a certain time elapses after the message is displayed, the sheet management application ends the display of the message.

Consequently, the sheet management application determines only whether the sheet held in the sheet holding unit can be used. Then, if the sheet held in the sheet holding unit is not replaced, the sheet management application can call the user's attention.

Further, depending on the type of the sheet holding unit, the printing apparatus 103 may include a control unit for controlling the opening and closing of the sheet holding unit as in a sheet holding deck. In this case, the print control apparatus 102 transmits to the printing apparatus 103 an instruction to open the sheet holding unit regarding which a change is to be made. Then, when the sheet held in the sheet holding unit is made unusable, the printing apparatus 103 having received the instruction from the print control apparatus 102 can be allowed to electrically open the sheet holding unit. Alternatively, when the printing apparatus 103 receives from the print control apparatus 102 an instruction to prohibit the use of the sheet holding unit regarding which a change is to be made, the printing apparatus 103 can make the sheet held in the sheet holding unit unusable and also electrically open the sheet holding unit.

Specifically, this corresponds to the time when the sheet management application transmits to the printing apparatus 103 an instruction to prohibit the use of the sheet held in the sheet holding unit in step S903. Alternatively, thereafter, the sheet management application transmits to the printing apparatus 103 an instruction to change the sheet holding unit to an open state. In either case, the printing apparatus 103 having received the instruction gives an instruction via the CPU 201 to a control unit for controlling the opening and closing of the sheet holding unit, and the control unit having received the instruction opens the sheet holding unit.

The configuration in which the sheet holding unit is thus electrically opened when sheet settings are made can be able to be switched between an enabled state and a disabled state through a setting screen (not illustrated) of the sheet management application. This function of opening the sheet holding unit when sheet settings are made not only can cause the user to certainly replace a sheet, but also provides the effect of allowing the user to immediately understand a sheet holding unit in which a sheet should be replaced.

As described above, a message for confirming a sheet is displayed on a sheet management application, whereby it is possible for the printing apparatus to more certainly hold a sheet suitable for sheet information in a sheet holding unit. Further, the opening and closing of a sheet holding unit for holding a sheet is controlled, whereby it is possible the printing apparatus to more certainly hold a sheet suitable for sheet information in a sheet holding unit.

In each of the embodiments, a configuration has been illustrated in which the print control apparatus 102 and the printing apparatus 103 are different apparatuses. Alternatively, the print control apparatus 102 and the printing apparatus 103 can be configured as a single apparatus.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2017-089643, filed Apr. 28, 2017, which is hereby incorporated by reference herein in its entirety.

What is claimed is:

1. A print control apparatus to communicate with a printing apparatus having a plurality of sheet holding units configured to hold sheets to be used for printing, wherein the printing apparatus is for conveying a sheet held in at least one of the plurality of sheet holding units and printing an image on the sheet, the print control apparatus comprising:
   a storage that stores sheet information of the sheets held in the plurality of sheet holding units;
   a user interface that selects a sheet holding unit from the plurality of sheet holding units and receives sheet information which is different from a size of the sheet held in the selected sheet holding unit; and
   controller that instructs, in a case where the sheet information stored in the storage unit of the sheet held in the selected sheet holding unit is changed to the sheet information received by the user interface, the printing apparatus not to use the sheet held in the selected sheet holding unit for printing until a predetermined condition is satisfied.

2. The print control apparatus according to claim 1, further comprising a display that displays the plurality of sheet holding units in a selectable manner,
   wherein the plurality of sheet holding units displayed in a selectable manner on the display are displayed with the sheet information of each of the sheets held in the plurality of sheet holding units, and
   wherein, in a case where the sheet information stored in the storage of the sheet held in the selected sheet holding unit is changed to the sheet information received by the user interface, the display changes display of the sheet information of the sheet held in the selected sheet holding unit.

3. The print control apparatus according to claim 2, wherein the display varies the display of the selected sheet holding unit between a state where the sheet held in the selected sheet holding unit is able to be used for printing and a state where the sheet held in the selected sheet holding unit is not able to be used for printing.

4. The print control apparatus according to claim 2, wherein the controller is further configured to receive a result of detecting whether a sheet is held in each of the plurality of sheet holding units,
   wherein, in a case where the selected sheet holding unit is an openable and closable internal sheet holding deck and the controller receives a detection result after the internal sheet holding deck is opened and closed indicating that a sheet is held in the internal sheet holding deck, the display displays information indicating that the sheet held in the internal sheet holding deck is allowed to be used for printing.

5. The print control apparatus according to claim 4, wherein, in a case where the controller instructs the printing apparatus not to use the sheet held in the internal sheet holding deck for printing, the printing apparatus opens the internal sheet holding deck.

6. The print control apparatus according to claim 2, further comprising a receiver that receives a result of detecting whether a sheet is held in each of the sheet holding units,
   wherein, in a case where the selected sheet holding unit is an inserter or a manual-bypass tray and the receiver receives a detection result that a sheet is held in the inserter or the manual-bypass tray, the display displays information indicating that the sheet held in the inserter or the manual-bypass tray is allowed to be used for printing.

7. The print control apparatus according to claim 2, wherein each display of a different one of the plurality of sheet holding units on the display includes a use assignment button indicating whether a sheet held in the sheet holding unit is able to be used for printing, and
   wherein, in a case where the use assignment button included in the display of the selected sheet holding unit is pressed, the controller instructs the printing apparatus not to use the sheet held in the selected sheet holding unit for printing.

8. The print control apparatus according to claim 7, wherein, in a case where the selected sheet holding unit is an external sheet holding deck externally connected to the printing apparatus and the use assignment button included in the display of the external sheet holding deck is pressed on the display, the controller instructs the printing apparatus not to use the sheet held in the internal sheet holding deck for printing.

9. The print control apparatus according to claim 8, wherein the display changes display of the use assignment button between display indicating that the sheet held in the selected sheet holding unit is able to be used for printing, and display indicating that the sheet held in the selected sheet holding unit is able to be used for printing.

10. The print control apparatus according to claim 2, wherein the display displays details of the sheet information of the sheet held in the selected sheet holding unit.

11. The print control apparatus according to claim 1, further comprising a display that indicates that the sheet held in the selected sheet holding unit is not able to be used for printing,
   wherein, in a case where the controller instructs the printing apparatus not to use the sheet held in the selected sheet holding unit for printing, the display indicates that the sheet held in the selected sheet holding unit is not able to be used for printing.

12. The print control apparatus according to claim 1, wherein the predetermined condition is a condition that a sheet is set in the selected sheet holding unit.

13. A control method for controlling a print control apparatus to communicate with a printing apparatus having a plurality of sheet holding units configured to hold sheets to be used for printing, wherein the printing apparatus is for conveying a sheet held in at least one of the plurality of sheet holding units and printing an image on the sheet, the control method comprising:
   storing sheet information of the sheets held in the plurality of sheet holding units;
   receiving sheet information which is different from a size of a sheet held in a sheet holding unit selected by a user from the plurality of sheet holding units; and
   instructing the printing apparatus, in a case where the stored sheet information of the sheet held in the selected sheet holding unit is changed to the received sheet information, instructing includes instructing the printing apparatus not to use the sheet held in the selected sheet holding unit for printing until a predetermined condition is satisfied.

14. A non-transitory computer-readable storage medium storing a program to cause a computer to execute a control method for controlling a print control apparatus to communicate with a printing apparatus having a plurality of sheet holding units configured to hold sheets to be used for printing, wherein the printing apparatus is for conveying a sheet held in at least one of the plurality of sheet holding units and printing an image on the sheet, the control method comprising:
   storing sheet information of the sheets held in the plurality of sheet holding units;
   receiving sheet information which is different from a size of a sheet held in a sheet holding unit selected by a user from the plurality of sheet holding units; and
   instructing the printing apparatus, in a case where the stored sheet information of the sheet held in the selected sheet holding unit is changed to the received sheet information, instructing includes instructing the printing apparatus not to use the sheet held in the selected sheet holding unit for printing until a predetermined condition is satisfied.

15. A print system having a plurality of sheet holding units configured to hold sheets to be used for printing, wherein the printing system is for conveying a sheet held in at least one of the plurality of sheet holding units and printing an image on the sheet, the print system comprising:
   a storage that stores sheet information of the sheets held in the plurality of sheet holding units;
   a user interface that selects in a sheet holding unit from the plurality of sheet holding units and receives sheet information which is different from a size of the sheet held in the selected sheet holding unit; and
   a controller that performs control, in a case where the sheet information stored in the storage of the sheet held in the selected sheet holding unit is changed to the sheet information received by the user interface, so that the sheet held in the selected sheet holding unit is not to be used for printing until a predetermined condition is satisfied.

16. The print system according to claim 15, wherein the predetermined condition is a condition that a sheet is set in the selected sheet holding unit.

* * * * *